United States Patent [19]

Young et al.

[11] Patent Number: 5,760,941
[45] Date of Patent: Jun. 2, 1998

[54] SYSTEM AND METHOD FOR PERFORMING OPTICAL CODE DIVISION MULTIPLE ACCESS COMMUNICATION USING BIPOLAR CODES

[75] Inventors: James F. Young; Benhaam Aazhang; Lim Nguyen, all of Houston, Tex.

[73] Assignee: Rice University, Houston, Tex.

[21] Appl. No.: 609,017

[22] Filed: Feb. 29, 1996

[51] Int. Cl.$^6$ .......................... H04J 14/08; H04B 10/04
[52] U.S. Cl. .................. 359/181; 359/125; 359/136; 359/184; 359/189
[58] Field of Search ........................... 359/181, 184, 359,185, 188, 189, 195, 124, 125, 132, 133, 135, 136

[56] References Cited

U.S. PATENT DOCUMENTS

| H1626 | 1/1997 | Kersey et al. | 370/479 |
|---|---|---|---|
| 4,006,304 | 2/1977 | Sell | 359/189 |
| 4,257,126 | 3/1981 | Theall, Jr. | 359/189 |
| 4,307,468 | 12/1981 | Beasley et al. | 359/181 |
| 4,337,457 | 6/1982 | Tache | 359/181 |
| 4,355,423 | 10/1982 | Theall | 359/195 |
| 4,410,878 | 10/1983 | Stach | 359/181 |
| 4,764,984 | 8/1988 | Franke et al. | 359/172 |
| 5,500,757 | 3/1996 | DeBlok | 359/189 |
| 5,508,508 | 4/1996 | Miller | 359/189 |
| 5,625,722 | 4/1997 | Froberg et al. | 359/181 |

OTHER PUBLICATIONS

O'Farrell et al., "Performance analysis of an optical correlator receiver for SIK DS-CDMA communications systems," Electronics Letters, Jan. 6, 1994, vol. 30, No. 1, pp. 63-65.

Tancevski et al., "Incoherent asynchronous optical CDMA using gold codes," Electronics Letters, Apr. 28, 1994, vol. 30, No. 9, pp. 721-723.

Zaccarin et al., "New architecture for incoherent optical CDMA to achieve bipolar capacity," Feb. 3, 1994, vol. 30, No. 3, pp.258-259.

Brandt-Pearce, "Multiuser Detection for Optical Code Division Multiple Access Systems," IEEE Transactions on Communications, vol. 42, No. 2/3/4, Feb./Mar./Apr. 1994, pp. 1801-1810.

Karafolas et al., "Self-Homodyne Code Division Multiple Access Technique for Fiber Optic Local Area Networks," IEEE Photonics Technology Letters, vol. 6, No. 7, Jul. 1994, pp. 880-883.

Budin et al., "Incoherent asynchronous optical CDMA using gold codes," Electronics Letters, Apr. 28, 1994, vol. 30, No. 9, pp. 721-723.

Parham et al., "Code division multiple-access techniques for use in optical-fibre local-area networks," Electronics & Communication Engineering Journal, Aug. 1992, pp. 203-212.

Karafolas et al., "Optical CDMA System Using Bipolar Codes and Based on Narrow Passband Optical Filtering and Direct Detection," IEEE Photonics Technology Letters, vol. 7, No. 9, Sep. 1995, pp. 1072-1074.

Andonovic et al., "Incoherent All-Optical Code Recognition with Balanced Detection," Journal of Lightwave Technology, vol. 12, No. 6, Jun. 1994, pp. 1073-1080.

Tamura et al., "Optical Code-Multiplex Transmission by Gold Sequences," Journal of Lightwave Technology, vol. LT-3, No. 1, Feb. 1985, pp. 121-127.

Timofeev et al., "High-performance, free-space ruled concave grating demultiplexer," Electronics Letters, Dec. 7, 1995, vol. 31, No. 25, pp. 2200-2201.

Walker, Ernest J., "A Theoretical Analysis of the Performance of Code Division Multiple Access Communications over Multimode Optical Fiber Channels—Part I: Transmission and Detection," IEEE Journal on Selected Areas in Communications, vol. 12, No. 4, May 1994, pp. 751-761.

Weiner et al., "Encoding and decoding of femtosecond pulses," Optics Letters, vol. 13, No. 4, Apr. 1988, pp. 300-302.

Zaccarin et al., "An Optical CDMA System Based on Spectral Encoding of LED," IEEE Photonics Technology Letters, vol. 4, No. 4, Apr. 1993, pp. 479-482.

Salehi et al., "Code Division Multiple-Access Techniques in Optical Fiber Networks—Part I: Fundamental Principles," IEEE Transactions on Communications, vol. 37, No. 8, Aug. 1989, pp. 824-833.

Kavehrad et al., "Optical Code-Divison-Multiplexed Systems Based on Spectral Encoding of Noncoherent Sources," Journal of Lightwave Technology, vol. 13, No. 3, Mar. 1995, pp. 534–545.

Neusy et al., "Proposal for an All-Optical Code-Division Multiple Access for Local Area Networks," Electronics Letters, Aug. 30, 1990, vol. 26, No. 18, pp. 1471–1473.

Wysocki et al., "1.55μm broadband fiber sources pumped near 980nm," SPIE vol. 1373 Fiber Laser Sources and Amplifiers II, 1990, pp. 66–67.

Verdú, Sergio, "Multiple-Access Channels with Point-Process Observations: Optimum Demodulation," IEEE Transactions on Information Theory, vol. IT-32, No. 5, Sep. 1986, pp. 642–651.

Brady et al., "A Semiclassical Analysis of Optical Code Division Multiple Access," IEEE Transactions on Communications, vol. 39, No. 1, Jan. 1991, pp. 85–93.

Griffin et al., "Demonstration of Data Transmission Using Coherent Correlation to Reconstruct a Coded Pulse Sequence," IEEE Photonics Technology Letters, vol. 4, No. 5, May 1992, pp. 513–515.

Pursley et al., "Performance Evaluation for Phase-Coded Spread-Spectrum Multiple-Access Communication—Part II: Code Sequence Analysis," IEEE Transactions on Communications, vol. COM-25, No. 8, Aug. 1977, pp. 800–803.

Hui, Joseph Y., "Pattern Code Modulation and Optical Decoding—A Novel Code-Division Multiplexing Technique for Multifiber Networks," IEEE Journal on Selected Areas in Communications, vol. SAC-3, No. 6, Nov. 1985, pp. 916–927.

Zaccarin, "Performance Evaluation of Optical CDMA Systems Using Non-Coherent Detection and Bipolar Codes," Journal of Lighwave Technology, vol. 12, No. 1, Jan. 1994, pp. 96–105.

Hornbeck, Larry J., "Deformable-Mirror Spatial Light Modulators," Proceedings of SPIE, The International Society for Optical Engineering, vol. 1150, Spatial Light Modulators and Applications III, Aug. 6–11, 1989, San Diego, CA, pp. 1–17.

Mizrahi, et al., "Four Channel fibre grating demuliplexer," Electronics Letters, May 12, 1994, vol. 30, No. 10, pp. 780–781.

Vellekoop, et al., "Four Channel Integrated-Optic Wavelength demultiplexer With Weak Polarization Dependence," Journal of Lightwave Technology, vol. 9, No. 3, Mar. 1991, pp. 310–314.

Hsu et al., "Multiple quantum well spatial light modulators," *Spatial Light Modulators and Applications III*, SPIE vol. 1150, Uzi Efron, Editor, Aug. 7–8, 1989, San Diego, CA, pp. 61–85.

*Primary Examiner*—Leslie Pascal
*Attorney, Agent, or Firm*—Conley, Rose & Tayon; Jeffrey C. Hood

[57] ABSTRACT

An optical encoding and decoding system which performs code-division multiple access (CDMA) communication in the incoherent, or direct detection, optical domain using bipolar +1/−1 codes. The present invention uses code modulation and detection principles that permit all-optical implementation of the bipolar, +1/−1, code and correlation detection that have been developed for the radio frequency (RF) systems. This is possible in spite of the non-negative, or unipolar, +1/0, nature of the incoherent optical system that only detects and processes the signal intensity. The unipolar optical system of the present invention is equivalent to the bipolar RF system in that the correlation properties of the bipolar codes is completely preserved. The optical CDMA system can be realized both in time or frequency domain encoding with all-optical components.

71 Claims, 10 Drawing Sheets

Encoder - General Block Diagram

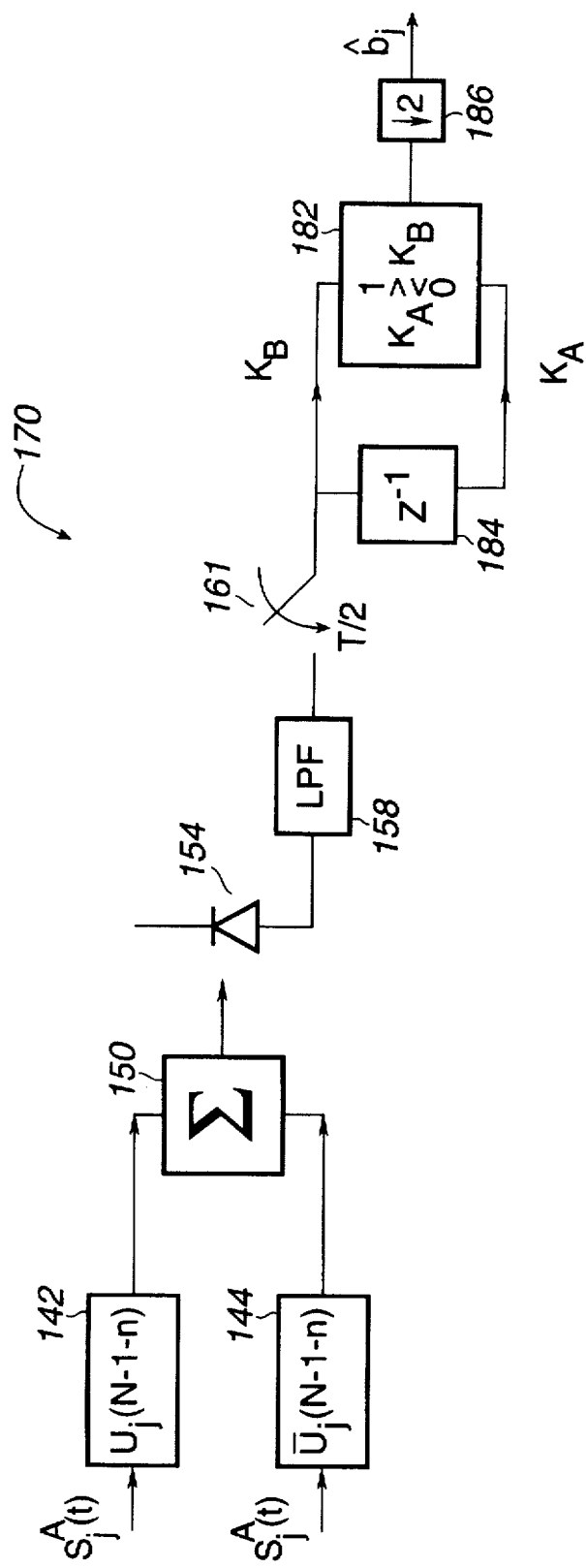
Fig. 4 Differential decoder configuration

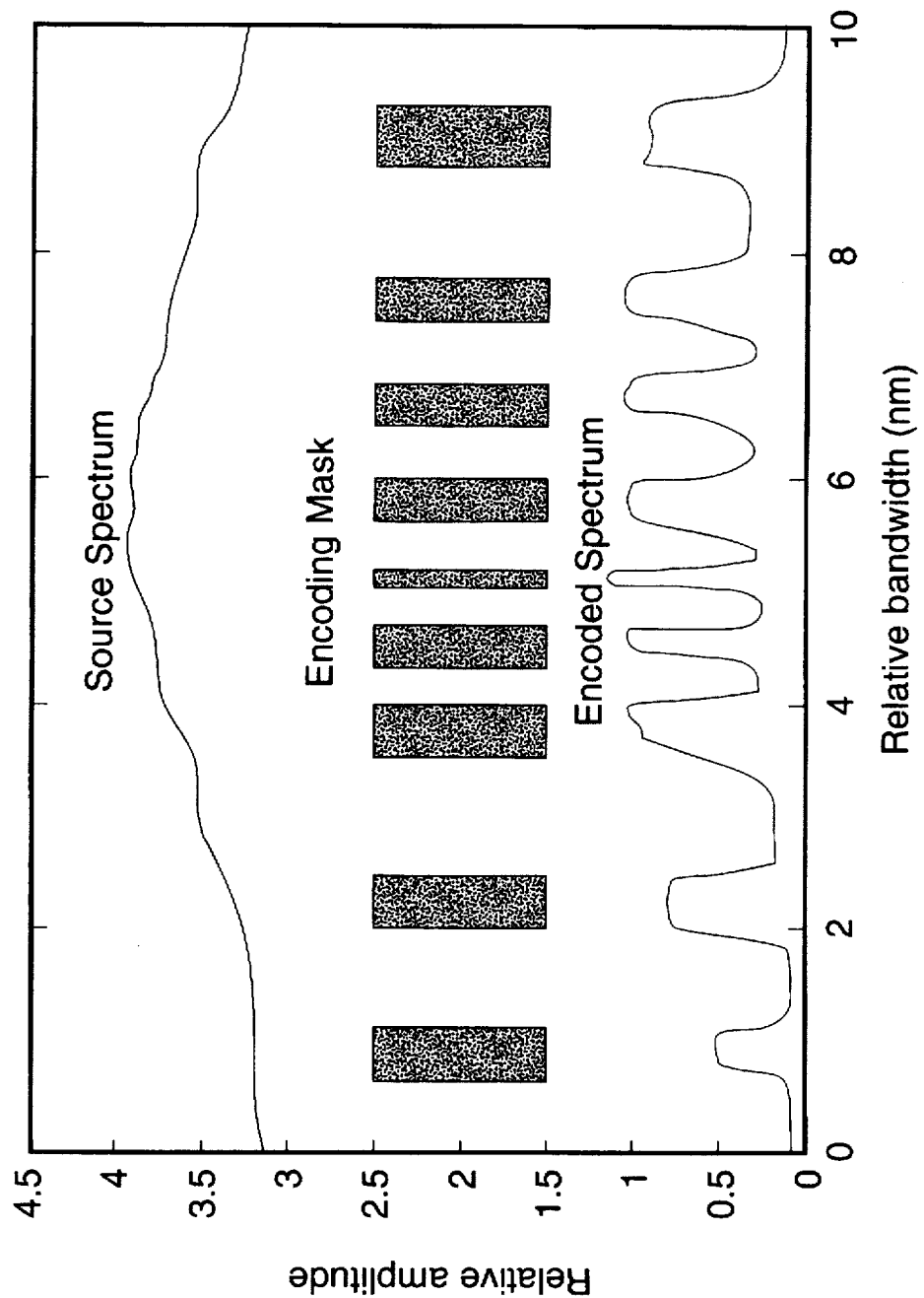
Fig. 7 Source spectrum, encoding mask and encoded spectrum seen at the decoder.

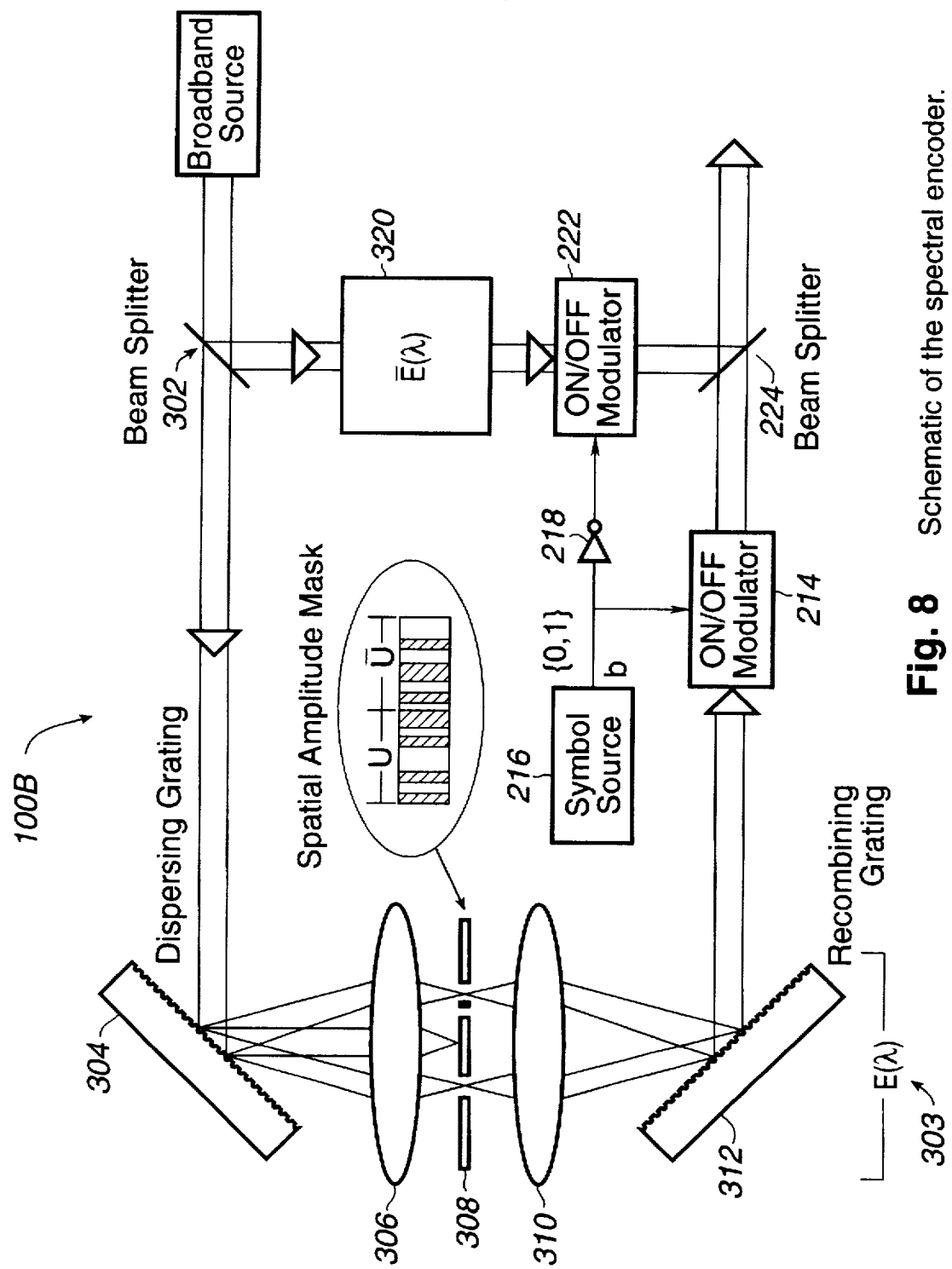
Fig. 8  Schematic of the spectral encoder.

Multi-channel optical CDMA

SYSTEM AND METHOD FOR PERFORMING OPTICAL CODE DIVISION MULTIPLE ACCESS COMMUNICATION USING BIPOLAR CODES

FIELD OF THE INVENTION

The present invention relates to data transmission on an optical or unipolar medium, and more particularly to a system and method for performing CDMA communication on an optical medium using unipolar codes which have bipolar code properties.

DESCRIPTION OF THE RELATED ART

A communication network generally includes many simultaneously active users out of a larger pool of subscribers with authorized access to the network. In a most general network connectivity, each user can transmit and receive information to and from every other user. The network resources therefore must be shared among the users in this multiple access scenario, with the network bandwidth being a fundamentally important resource.

Various types of networks currently exist, including those based on electrical signal transmission over cable or wiring, and optical networks which use light transmission is over fiber optic cable. In general, the optical domain has the greatest potential bandwidth due to the enormous bandwidth at the optical frequency. For example, the low-loss window of a single-mode optical glass fiber has a bandwidth of about 25,000 GHz each at the 1300 nm and 1550 nm wavelength. Graded-index plastic fiber, currently achieving a more modest 20 GHz bandwidth over a distance of 100 m, is becoming attractive due to its potentially lower implementation cost for short-distance applications such as the local area network (LAN).

The usual approach to optical communication system design has been to apply the techniques of RF (radio frequency) and microwave systems. Thus many optical communication systems include electronic components for transmission and reception of data. However, in RF and microwave systems, bandwidth is more limited and thus is at a premium. For example, the highest microwave frequency is only a small fraction of the bandwidth of optical fiber. Thus the limiting speed of electronic components, typically a few GHz in practice, places a considerable restriction on the optical system performance in term of the bandwidth utilization.

Therefore, in order to realize the potential of the optical medium, optical communication system design should be based on the unique characteristics of the optical domain. In other words, optical communication system design should enable the use of the virtually-unlimited available bandwidth in the optical domain to address certain network issues. For example, the large bandwidth of the optical domain should address the multiple access, or multi-user, requirement, i.e., how to control the interference from multiple simultaneously active users to enable co-existence of the multiple users.

One approach to address the multi-user requirement is referred to as the frequency-division multiple access (FDMA) protocol. In an FDMA protocol, the bandwidth is partitioned into non-overlapping segments and assigned to the subscribers in a predetermined manner. Each subscriber has the interference-free use of his allocated bandwidth segment at all times, much like the radio broadcasting station system. One problem with the FDMA protocol is that if the subscriber access to the network is bursty, FDMA does not have efficient bandwidth utilization. Moreover, as new subscribers arrive, the bandwidth resource must be re-allocated, which may be neither feasible nor desirable.

Another multi-user protocol that is more flexible is referred to as time-division multiple access (TDMA). In a TDMA protocol, non-overlapping, band-limited time slots are assigned to the subscribers so that each has the interference-free use of the entire bandwidth during his allocated time slot. New subscribers can be accommodated simply by increasing the number of time slots. Like FDMA, the TDMA protocol has inefficient bandwidth utilization in a bursty network. Each subscriber has a very short duty cycle transmission and requires time slot synchronization for proper operation. Since only one user is allowed to access the network at any time instance, the TDMA protocol is essentially a coordinated single user system. Common variants of the TDMA approach are Token-Ring and Ethernet networks, which depend on higher level protocols for multiple-access collision avoidance and resolution.

A protocol referred to as Code-Division Multiple Access (CDMA) is the most flexible protocol and allows each subscriber the full use of the bandwidth resource at all times. In the CDMA protocol, the subscribers are differentiated from one another by the use of distinct signature sequences. Multiple access interference (MAI) due to the time and frequency overlapping signals from the simultaneously active users is controlled by choosing signature sequences that have low correlation values. CDMA is highly suited for a bursty network. CDMA also fully uses the bandwidth resource, resulting in good system performance that is gracefully degraded as the number of active users increases. This interference-limited performance, coupled with other attributes that have proven effective in combating the mobile communication environment, has caused CDMA to receive considerable attention in the next generation of RF cellular phone technologies.

In the optical domain, FDMA is commonly known as wavelength-division multiple access (WDMA). In the optical domain the number of wavelengths or channels is small due to the wavelength stability and tuning range of diode lasers. Non-linear effects in the optical fiber such as four-wave mixings also contribute to place an upper limit on a WDMA system. Optical TDMA requires short-pulsed diode lasers (or high-speed diode laser/modulators) whose transform-limited bandwidth is far less than optical fiber bandwidth. The pulse propagation of short-pulsed diode lasers suffers from dispersion effects in the optical fiber, limiting the transmission distance unless exotic nonlinear techniques like soliton are used. Thus, besides the inherent drawbacks mentioned above, the FDMA and TDMA protocols have addition limitations when used in the optical domain.

The CDMA protocol has many desirable characteristics which are effective in the optical domain. Thus the CDMA protocol is an attractive approach toward the goal of using the optical bandwidth resource to meet the practical network requirement of supporting a large pool of subscribers, not all of whom require access to the network at the same time, while providing access to many simultaneously active users.

Historically, CDMA is an application of the secured and anti-jamming communication techniques developed for the military in the RF domain. CDMA is based on spread spectrum principles that distribute the energy of the user signal over a bandwidth much larger than required by the binary information symbol rate. The bandwidth expansion is accomplished by modulating the information symbol with spreading codes, or signature sequences, that are uniquely assigned to different users. Thus the transmitter uses the unique spreading code to distribute the transmission across the frequency domain. The different spreading codes or signature sequences are designed with low, or ideally zero, cross-correlations, thus allowing the receiver to differentiate them by means of correlation detection.

The huge bandwidth of optical fiber relative to the symbol rate means that the size of the code book, and thus the number of users, can be very large. Practically, in order to realize this bandwidth advantage, the encoding (bandwidth expansion) and correlation (bandwidth contraction) operations on the signal at the transmitter and receiver, respectively, must be performed optically. Optical encoding and decoding operations circumvent the speed limitation of the electronic system. Accordingly, the electronic system can then be allowed to operate at the much slower symbol rate.

The success of an RF CDMA system depends crucially on the use of well designed bipolar sequences or codes with good correlation properties. Bipolar sequences comprise sequences of +1/−1 values, wherein unipolar sequences comprise sequences of 1/0 values. There has been a large body of work devoted to the search for good bipolar codes; among them are the m-sequence, Gold, Kassami sequences and the orthogonal Walsh code. These bipolar sequences of +1/−1 values exist in the RF domain because the phase of an electromagnetic field, i.e., the phase of the EM signal, can be detected.

The application of RF system CDMA techniques to the optical domain, however, has not been very successful, primarily due to the non-negative nature or unipolar nature of the direct detection optical channel. In the optical domain, direct detection refers to the optical field being square-law detected by a photodetector. Thus, with direct detection in the optical domain, only the signal intensity can be detected and processed. Direct detection in the optical domain is extremely desirable because all-optical processing of the transmitted and received signals is feasible. This enables the interface between the electronic symbol source and the optical system to operate at the symbol rate. The restriction on the optical bandwidth utilization imposed by the limiting speed of the electronic components is thus completely eliminated.

As a result of the unipolar nature of the optical medium, in optical systems only unipolar sequences that take on +1/0 values have been possible. The bipolar codes of the RF domain have therefore been thought to be inapplicable to the optical system. With correlation detection using unipolar codes, the unipolar spreading codes are restricted to be sparse, optical orthogonal codes that are inefficient and too few in number for practical application.

There has been considerable interest in applying CDMA techniques developed in the radio domain to optical fiber LANs. As mentioned above, a LAN must support a large pool of subscribers, not all of whom require access to the network at the same time. As noted above, however, the bipolar codes of the radio domain have generally been thought to be inapplicable to non-coherent optical systems, which only detect and process the signal intensity. Various schemes that have been proposed require balanced/special codes, offset removal, or electronic correlations that preclude the general, all-optical, application of the bipolar codes. For example, T. O'Farrell and S. Lochmann, "Performance analysis of an optical correlator receiver for SIK DS-CDMA communication systems," *Electron. Lett.* 1994, 30, (1), pp. 63–65, and L. Tancevski, L. Bazgaloski, I. Andonovic, and J. Budin, "Incoherent asynchronous optical CDMA using Gold codes" *Electron. Lett.*, 1994, 30, (9), pp. 721–723 describe a system which utilizes balanced/special codes and offset removal, which precludes an all-optical application of bipolar codes. Also, D. Zaccarin and M. Kavehra, "New architecture for incoherent optical CDMA to achieve bipolar capacity" *Electron. Lett.*, 1994, 30, (3), pp. 258–259, describes a system which utilizes electronic correlations, which also precludes an all-optical application of bipolar codes.

Therefore, an encoding and detection system and method is greatly desired which allows the bipolar codes of the RF domain to be used in the optical domain. A system and method is further desired which enables use of bipolar codes in the optical domain, wherein the bipolar codes retain their correlation properties. Further, a system and method is desired which uses optical CDMA communications with bipolar codes that mitigates the problems associated with the optical fiber medium and the limitations imposed by practical light sources.

SUMMARY OF THE INVENTION

The present invention comprises an optical communication system and method which uses code-division multiple access (CDMA) communication using bipolar +1/−1 codes in the incoherent, or direct detection, optical domain. The present invention uses code modulation and detection principles that permit all-optical implementation of the bipolar +1/−1 codes that have been developed for the radio frequency (RF) systems. The present invention enables the use of bipolar codes in the optical domain in spite of the nonnegative, or unipolar, +1/0, nature of the incoherent optical system, which only detects and processes the signal intensity. The optical communication system of the present invention is equivalent to the bipolar RF system, whereby the correlation properties of the bipolar codes are completely preserved.

In an RF bipolar system using CDMA, each user is assigned two bipolar codes, one for sending a "1" and one for sending a "0", wherein the two codes are typically complements of each other. In the optical CDMA system of the present invention, each bipolar code of length N is re-coded into two unipolar sequences/words of length N. Thus, a first bipolar code which represents a "1" is re-encoded into a unipolar code comprising two unipolar words referred to as U and U', which are preferably the binary complement of each other. Likewise, a second bipolar code which represents a "0" is re-encoded into a unipolar code comprising two unipolar words referred to as V and V', which are also preferably the binary complement of each other. In the preferred embodiment, the original two bipolar codes are complements of each other, and thus the unipolar codes U & U' and V & V' are also complements of each other, i.e., V & V'=U'and U.

In the system of the present invention, the two unipolar words U and U' are both sent to indicate a symbol, e.g. a "1", and the two unipolar words V and V' are both sent to indicate a "0". The two words are preferably sent on two different fibers, or using different polarizations, or using time or frequency multiplexing (independently of whether each word is encoded in time or frequency). In one embodiment, each word is encoded in the optical frequency domain using adjacent frequencies for each word. Stated in another way, one unipolar code or sequence of length 2N is formed by concatenating the two words, either U and U', or V and V', and assigning adjacent frequency chips to each element of the sequence.

The present invention uses the fact that a bipolar sequence x(n) of length or period N that takes either of two values, which is typically represented as {−1,1} in the RF domain using the phase of an EM signal, can be expressed as the difference of two unipolar words or sequences with the same period, say u(n) and ū(n), that each take values from {0,1}. The unipolar sequence u(n) is obtained from x(n) by replacing each −1 with 0, and ū(n) is the binary complement of u(n).

The present invention includes an encoder which receives a light beam and generates a specific optical code to represent either a "1" or a "0". A symbol source is coupled to the encoder and provides the symbol or data desired to be transmitted. The encoder then generates the respective unipolar optical code corresponding to the desired symbol. In the preferred embodiment of the invention, the encoder transmits the 2N unipolar code U and U' to indicate a "1", and the encoder transmits the 2N unipolar code V and V' to indicate a "0". As described above, the two unipolar words U and U' comprising the first unipolar optical code are generated from a first bipolar code which represents a "1". Likewise, the two unipolar words V and V' comprising the first unipolar optical code are generated from a second bipolar code which represents a "0".

The present invention also includes a decoder which receives transmitted optical signals and detects the transmitted symbol. The decoder includes a plurality of matched filters designed to correlate with the unipolar optical codes of the respective user and also designed to reject the codes of other users. The decoder also includes a detector which detects the transmitted information or symbol.

A preferred optical implementation of a spectral encoder includes a frequency dispersing element which receives the signal source or light beam and generates a dispersed light beam having separated frequency components. The optical encoder also includes one or more optical masks, preferably one spatial amplitude mask, which receives the light beam and produces the first unipolar optical code and the second unipolar optical code. The spatial amplitude mask preferably comprises a reflective material and includes a plurality of holes. A transmitted portion of the dispersed light beam passes through the spatial amplitude mask to produce optical signals including the first unipolar code, e.g., U and U', and a portion of the dispersed light beam is reflected from the spatial amplitude mask to produce optical signals including the second unipolar code, e.g., U' and U. A symbol source is coupled to the optical encoder and provides the data intended to be transmitted to the encoder. First and second on/off modulators receive the data intended for transmission and select the optical signals including the appropriate unipolar code.

An optical implementation of a spectral decoder includes a frequency dispersing element which receives optical signals and generates a dispersed light beam having separated frequency components. The optical decoder also includes an optical mask, preferably a spatial amplitude mask, which receives the dispersed light beam and correlates the dispersed light beam with the user's first and second unipolar codes. The optical decoder also includes two photodetectors which receive the two decoded sequences and generate corresponding electrical signals. The photodetectors are preferably connected such that their outputs are subtracted. Thus the electrical signals output from the photodetectors are subtracted to produce an output electrical signal. The output electrical signal is provided through a low pass filter and a time sampling switch to a detector. If the received optical signals include one of the user's unipolar codes, the detector detects the transmitted data or symbols comprised in the output electrical signal.

Thus the present invention comprises new modulation and detection principles that permit all-optical implementation of the bipolar, +1/−1, codes that have been developed for the radio frequency (RF) systems. This is possible in spite of the non-negative, or unipolar, +1/0, nature of the incoherent optical system that only detects and processes the signal intensity. The unipolar optical system designed with these principles is equivalent to the bipolar RF system in that the correlation properties of the bipolar codes is completely preserved. The present invention thus provides the functional output of a bipolar system in a unipolar optical communication environment. The present invention essentially provides the same effect as if the optical detector could determine the phase of the optical signal.

BRIEF DESCRIPTION OF THE DRAWINGS

A better understanding of the present invention can be obtained when the following detailed description of the preferred embodiment is considered in conjunction with the following drawings, in which:

FIG. 4 illustrates an alternate and preferred embodiment of a differential decoder which uses only one matched filter pair and one photodetector;

FIG. 7 illustrates the source spectrum, encoding mask, and encoded spectrum seen at the decoder of FIG. 6;

FIG. 8 is a schematic diagram of a spectral encoder which utilizes two optical masks according to the present invention;

DETAILED DESCRIPTION OF THE PREFERRED EMBODIMENT

Incorporation By Reference

Figure 1:
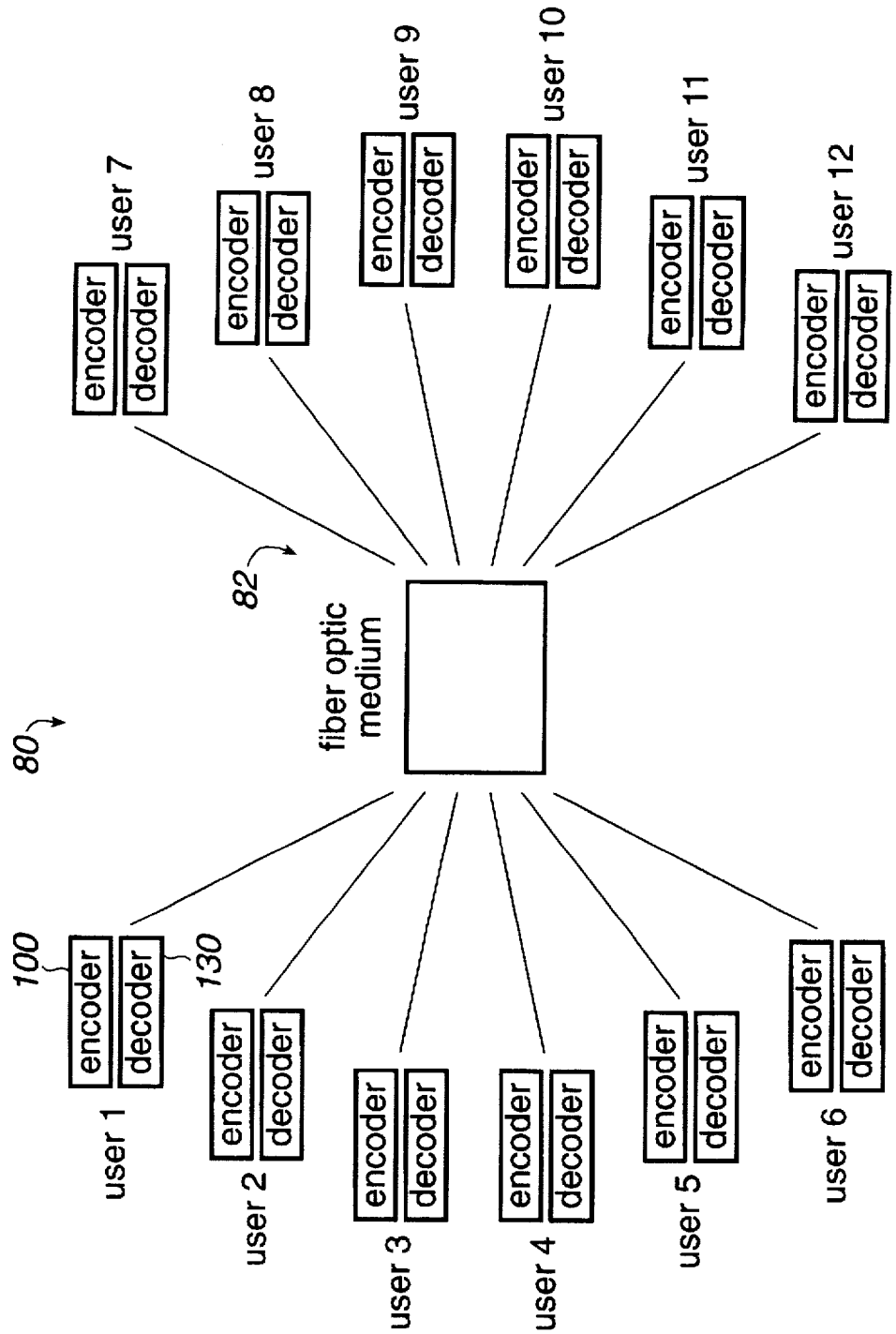
FIG. 1 illustrates an optical network according to the present invention.

The following publications are hereby incorporated by entirety as though fully and completely set forth herein.

L. Nguyen, B. Aazhang, and J. F. Young, "All-optical CDMA with Bipolar Codes", *Electronics Letters*, 31, (6), pp. 469–470, 1995.

L. Nguyen, B. Aazhang, and J. F. Young, "Optical CDMA with Spectral Encoding and Bipolar Codes", in *Proceedings of the 29th Annual Conference on Information Sciences and Systems*, The John Hopkins University, Baltimore, Md. March, 1995.

L. Nguyen, B. Aazhang, and J. F. Young, "BER of Optical Communication System with Fiber Source", in *Proceedings of the 1995 IEEE International Symposium on Information Theory*, Whistler, B. C., Canada, September, 1995.

L. Nguyen, J. F. Young, and B. Aazhang, "Photocurrent Distribution of a Superfluorescent Fiber Source", in *Technical Proceedings of the LEOS '95 Conference*, San Francisco, Calif. Oct. 30–Nov. 2, 1995.

L. Nguyen, J. F. Young, and B. Aazhang, "Photoelectric Current Distribution and Bit-Error Rate in Optical Communication Systems using a Superfluorescent Fiber Source", Submitted to *IEEE Journal of Lightwave Technology*, May, 1995.

L. Nguyen, T. Dennis, B. Aazhang, and J. F. Young, "Demonstration of Bipolar Codes for Direct Detection Multi-user Optical Communication", submitted to the Optical Society of America; *Optical Fiber Conference '96*.

T. O'Farrell and S. Lochmann, "Performance analysis of an optical correlator receiver for SIK DS-CDMA communication systems," *Electron. Lett.*, 1994, 30, (1), pp. 63–65.

L. Tancevski, L. Bazgaloski, I. Andonovic, and J. Budin, "Incoherent asynchronous optical CDMA using Gold codes" *Electron. Lett.*, 1994, 30, (9), pp. 721–723.

D. Zaccarin and M. Kavehra, "New architecture for incoherent optical CDMA to achieve bipolar capacity" *Electron. Lett.* 1994, 30, (3), pp. 258–259.

J. Salehi, "Code division multiple-access techniques in optical fiber networks - part I: Fundamental principles" IEEE Trans. Commun., 1989, 37, (8), pp. 824–833.

D. Zaccarin and M. Kavehrad, "An optical CDMA system based on the spectral encoding of LED," *IEEE Photonics Tech. Letters*, 1993, 4, (4), pp. 479–482.

S. S. Wagner and T. E. Chapuran, "Broadband high-density WDM transmission using superluminescent diodes," Electron. Lett., 1990, 26, (11), pp. 696–697.

P. F. Wysocki, M. J. F. Digonnet, and B. Y. Kim, "1.55 um broadband fiber sources pumped near 980 nm," SPIE Fiber Laser Sources and Amplifiers II, 1990, 1373, pp. 66–77.

The present invention comprises a system and method for the transmission and detection of bipolar code division multiple access (CDMA) sequences in a unipolar system. The present invention thus provides an optical communication system which performs CDMA communication using bipolar codes. In other words, the present invention allows all-optical implementation, in non-coherent optical CDMA systems, of the bipolar codes that have been developed for the radio frequency (RF) domain. The present invention thus comprises a general modulation and detection system and method that allows all-optical implementation of bipolar codes and correlation detectors.

CDMA bipolar encoding is common in the radio frequency domain to distinguish among users because RF detectors can determine the phase of the transmitted signal, i.e., can determine whether a signal is in phase or 180 degrees out of phase. In other words, the receiver can lock onto the radio frequency wave and determine the difference between a plus and a minus due to the phase of the electromagnetic (EM) signal. Thus the codes that have been developed for the radio frequency domain all consist of −1/+1 sequences encoded using a phase shift of the signal, i.e., can determine whether the transmitted signal is in phase or 180 degrees out of phase.

In the RF domain a long time interval of the transmitted signal is typically broken up into a plurality of small time intervals referred to as chips. In each section or chip the signal is either positive or in phase, or negative, i.e., 180 degrees out of phase. Thus energy is transmitted in every single interval, and there is a large amount of energy in the whole window. The bipolar codes comprise the distribution of plus ones and minus ones in each of the chips or slots.

In the normal RF bipolar system using CDMA, each user is assigned two codes, one for sending a "1" and the other for sending a "0". Almost always, one code is the negative (or complement) of the other. This is possible because of the bipolar nature of the RF channel and is convenient for decoding. When the decoder performs a correlation of received signals against the "1" code of the desired user, if a "1" is indeed sent, the correlator output is a large positive number (proportional to the length of the code). If a "0" is sent, the result is a negative number of the same magnitude. Other users' codes, for either symbol, yield small, or ideally zero values. Thus if the detector following the correlator detects a large magnitude output, this indicates that the decoder has received a symbol intended for the user of the decoder. The detector can then determine the sign of the output to determine what symbol has been sent.

Therefore, the basic idea of bipolar codes is that bipolar codes have a very high autocorrelation and they have very low, or ideally zero, cross-correlations. Thus a simple correlator or matched filter detector only sees the one code that it is matched for, and other filters all have a substantially zero correlation with that code. These very low cross-correlations or zeros are obtained due to the cancellations between plus ones and minus ones, i.e., the cancellations of the different phases of the signals.

In the optical domain, it is difficult and/or impossible to detect the phase of a light wave. Rather, in the optical domain, photodetectors, referred to as square law detectors, are only able to detect the presence or absence of energy, i.e., the presence or absence of a light pulse. Thus optical detectors are only able to determine if energy is present or not present. The optical domain is thus a unipolar channel having only ones and zeros, and does not have the requisite +1/−1 characteristics of the RF domain. Thus, bipolar codes that work well in the RF domain do not work in the optical domain due to its unipolar nature.

Unipolar codes that have been developed for the optical domain do not have very good properties compared to the bipolar codes. In general, unipolar codes in the optical domain are very few for a given length or given number of chips and only send energy in a few of the available chips, and thus the total sent energy is low. Thus, for unipolar codes in the optical domain, the autocorrelations are low relative to the code length, and the cross-correlations are high relative to the autocorrelation. As a result, only a limited number of people can access the network at the same time without causing severe interference to one another.

A guide for how many people can use a network at the same time is the ratio of the autocorrelations to the cross-correlations. If the cross-correlation is 0.01 and the autocorrelation is 1.00, for example, then up to 50 simultaneous users may exist in the background before the cross-correlations add up and affect the detection. RF bipolar codes have very good autocorrelation to cross-correlation ratios. Unipolar codes developed for the optical domain have poor ratios. Thus CDMA communication is not generally used in the optical domain.

The present invention enables the use of CDMA bipolar codes in a unipolar domain, such as the optical domain. The present invention recodes the RF bipolar codes into the optical domain using two unipolar codes. The present invention also includes a detector structure which exactly mimics the behavior of the bipolar correlators used in the RF domain. Thus the present invention enables the use of bipolar codes in the optical domain, which previously could only be used in the radio frequency domain. This enables the bipolar code properties to be achieved in the optical domain.

In the present disclosure, the lower case "u" or "v" refers to a sequence of infinite length, and the upper case "U" or "V" refers to a period of finite length of the sequence, referred to as a code or word. In the present disclosure, a "bar" on top of a letter, e.g., $\overline{U}$, and a prime following a letter, e.g., U', are both intended to indicate a complement.

FIG. 1—Communication System

Referring now to FIG. 1, a communication system 80 according to the present invention is shown which includes a plurality of interconnected users. The communication system 80 is preferably an optical communication system or other type of unipolar system. The communication system may be configured in various manners, such as a star or ring topology, among others. The communication system 80 preferably uses fiber optic cable 82 as the communications medium between the various interconnected users. The communication system uses CDMA techniques with unipolar sequences or codes according to the present invention to distinguish among each of the users, wherein the unipolar codes have bipolar code properties. In the preferred embodiment, the unipolar codes represent or correspond to bipolar codes used in the RF domain.

Each user preferably includes an encoder 100 for generating encoded messages on the network, and a decoder 130 for receiving encoded messages on the network. Each user also preferably includes a broadband optical source (not shown). The present invention encodes the spectrum of the broadband optical source to support a large number of subscribers. The encoder 100 and decoder 130 preferably comprise all-optical components for improved performance.

In the preferred embodiment, each encoder 100 is configured to encode data intended for transmission using unipolar codes which correspond to the intended receiver or destination. In this embodiment, each decoder 130 is configured to detect and decode only those transmissions which include the unipolar codes corresponding to the user of the decoder 130.

In an alternate embodiment, each encoder 100 is configured to encode data intended for transmission using respective unipolar codes which correspond to the user of the encoder 100. In this embodiment, each decoder 130 is configured to detect and decode all transmissions which include valid unipolar codes corresponding to other users.

Figure 2:
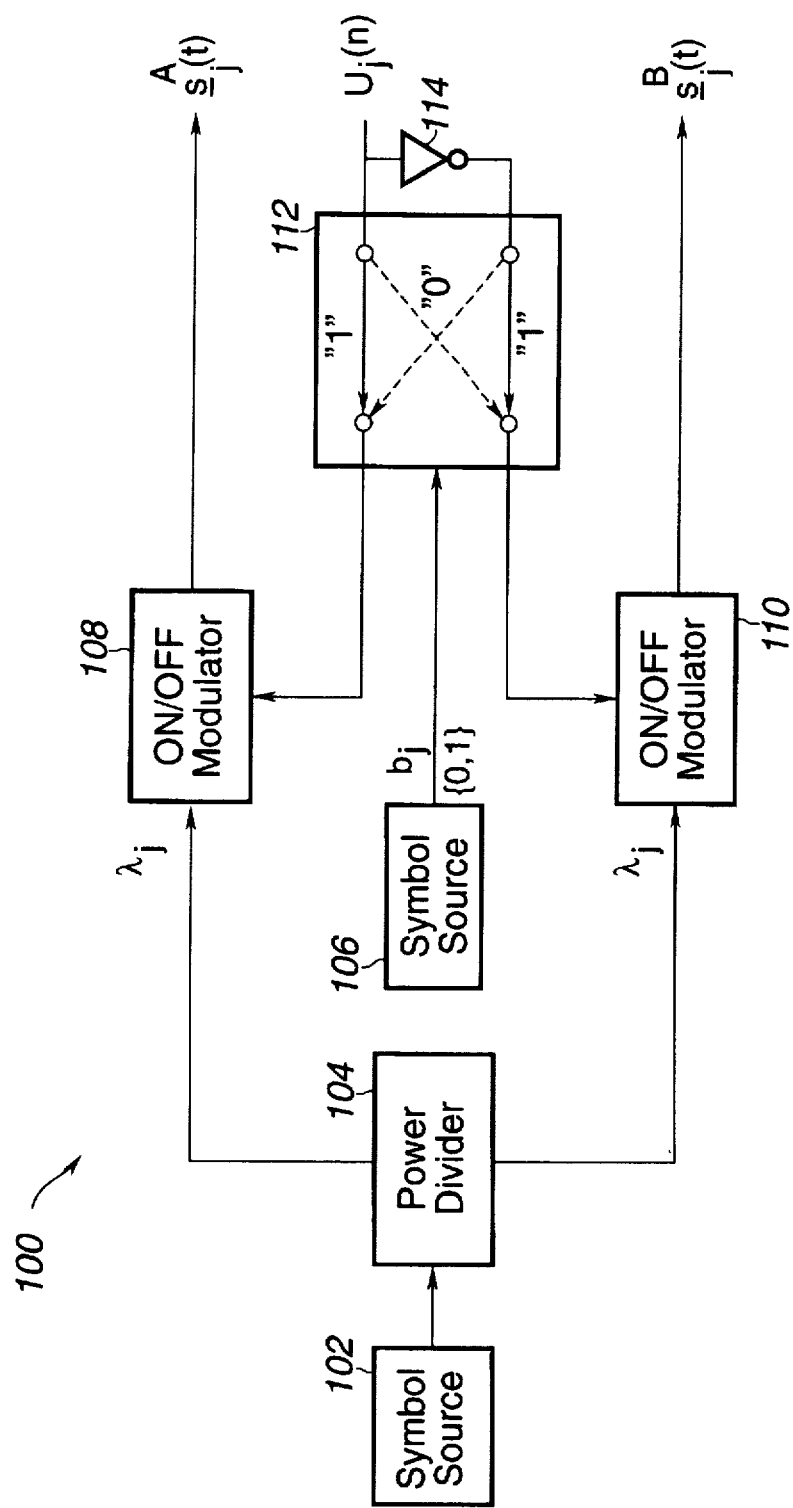
FIGS. 2 and 2A show block diagrams of an optical encoder which generates optical signals using bipolar codes according to the present invention.
Figure 2A:
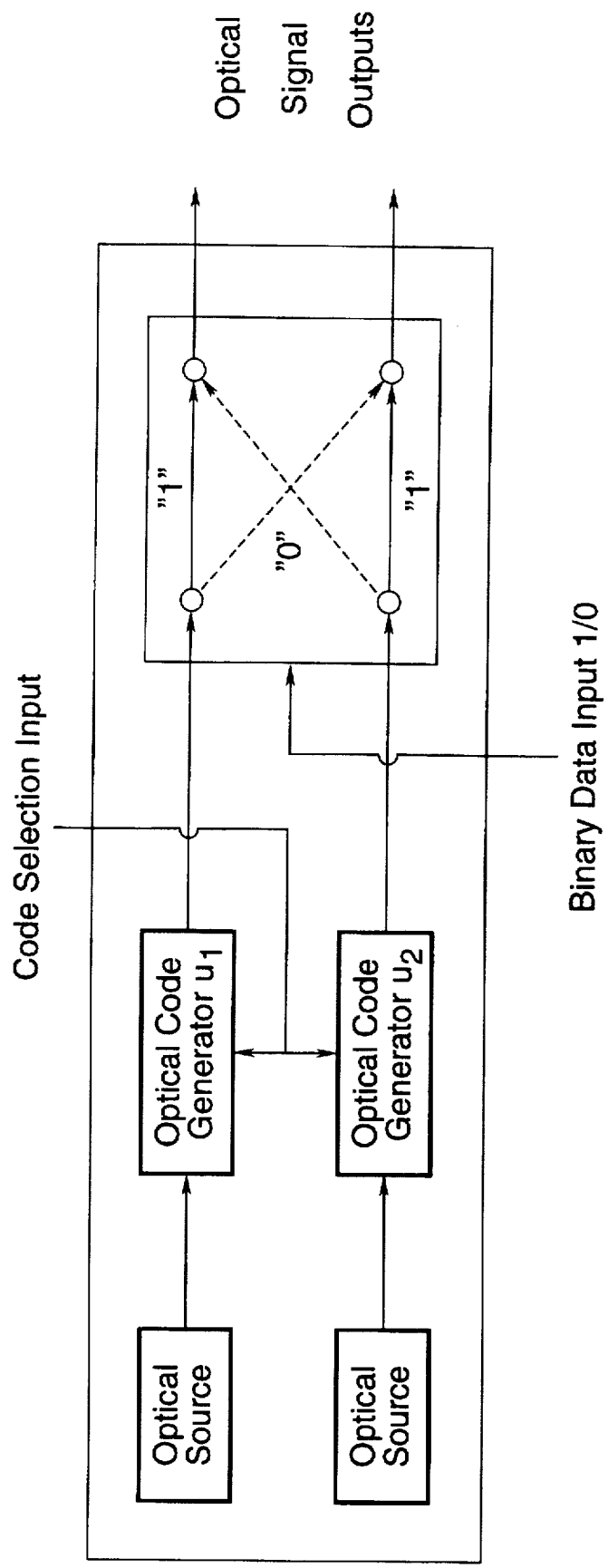
Figure 3:
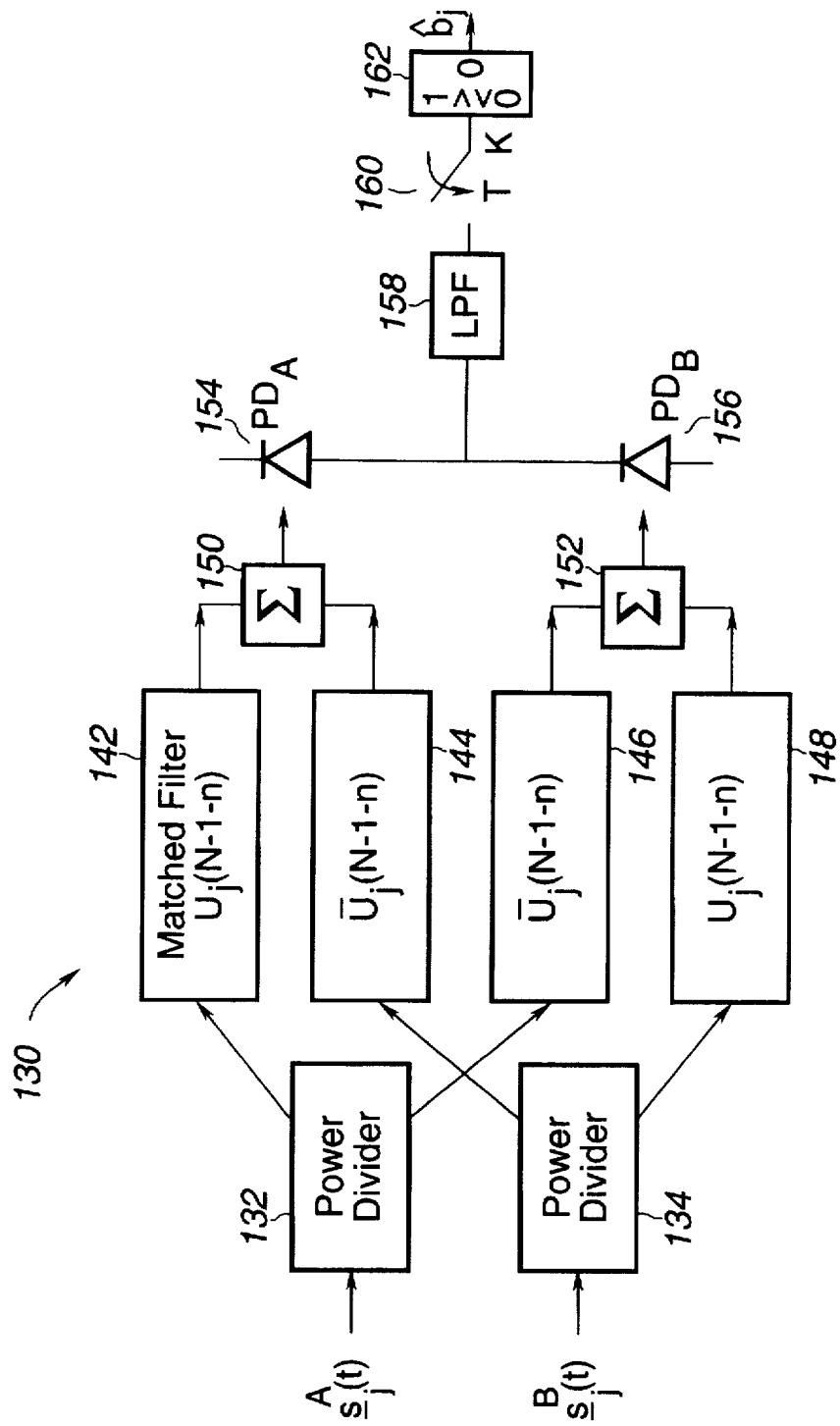
FIG. 3 is a block diagram of an optical decoder which receives and decodes optical signals encoded with bipolar codes according to the present invention.

FIG. 2 is a block diagram of an optical encoder 100 according to the present invention, and FIG. 3 is a block diagram of an optical decoder 130 according to the present invention. FIG. 2A is a more general block diagram of an encoder 100, which may be either a time or spectral encoder. It is noted that the block diagrams of FIGS. 2, 2A, and 3 are illustrative only, and actual optical implementations of the encoder 100 and decoder 130 are shown in FIGS. 5 and 6, respectively.

FIG. 2—Encoder Block Diagram

As shown, a system for generating optical signals including unipolar codes according to the present invention includes a signal source 102, a symbol source 106 and encoder 100. The signal source 102 is coupled to the encoder 100 and supplies the transmission signal. In the preferred embodiment comprising an optical communication system, the signal source 102 is a broadband optical source such as a superfluorescent fiber source (SFS). The broadband optical source or SFS generates an optical signal or light beam. In the present disclosure, the term "light beam" is intended to encompass any of various types of optical signals or unipolar signals, including broadband optical signals and lasers. The signal source 102 may comprise other types of unipolar and/or optical sources, as desired.

The signal source 102 provides an output to a power divider 104 in the encoder 100. The power divider 104 operates to provide half of the signal source output to each of two Code to Signal Generators 108 and 110, also referred to as On/Off Modulators. The power divider 104 provides an output $\lambda_j$ to the Code to Signal Generator 108 and provides a substantially identical output $\lambda_j$ to the Code to Signal Generator 110. The output $\lambda j$ denotes the optical signal intensity for user j. Thus the output $\lambda_j$ comprises the light beam or light pulse which is to be modulated with the user's unipolar codes representing the data to be transmitted.

The encoder 100 of FIG. 2 accepts the symbol source 106 which supplies the data desired or intended to be transmitted on the network or communication media, referred to as $b_j$, where j denotes the jth user in the network. The symbol source 106 provides the information or data desired to be transmitted to the encoder 100, such as data from a first user intended for a second user. The data to be transmitted is preferably digitized or binary data, i.e., 1's and 0's. For example, the data to be transmitted may comprise an analog signal which has been sampled and quantized to form digital data or binary data. Thus the symbol source provides a binary output to the encoder 100. The symbol source 106 may be a computer or other digital device. The symbol source 106 may also receive data through an analog to digital (A/D) converter from an analog source.

The symbol source 106 provides the data input to a cross-bar switch 112. The cross-bar switch 112 for the jth user accepts two unipolar input words referred to as $U_j(n)$ and $\overline{U}_j(n)$. The unipolar word $\overline{U}_j(n)$ is the binary complement of the unipolar word $U_j(n)$ by means of the digital inverter 114. The two unipolar outputs or words $U_j(n)$ and $\overline{U}_j(n)$ collectively represent a bipolar code. In this embodiment, the two unipolar words $U_j(n)$ and $\overline{U}_j(n)$ collectively comprise a first unipolar optical code corresponding to a first bipolar code of the user, e.g., a "1". Likewise, the two unipolar words $\overline{U}_j(n)$ and $U_j(n)$ collectively comprise a second unipolar optical code corresponding to a second bipolar code of the user, e.g., a "0".

The Code to Signal Generators 108 and 110 each receive the light beam or light pulse from the power divider 104, and the respective outputs from the cross-bar switch 112. The Code to Signal Generators 108 and 110 each use the data $b_j$ encoded by $U_j(n)$ and $\overline{U}_j(n)$ to generate optical signals using the output from the signal source 102. In other words, the unipolar words input to cross-bar switch 112 are switched according to the values of the symbol $b_j$. If the symbol $b_j$ is "1", then $U_j(n)$ is provided to Code to Signal Generator 108 and $\overline{U}_j(n)$ is provided to Code to Signal Generator 110. If the symbol $b_j$ is "0", then $U_j(n)$ is provided to Code to Signal Generator 110 and $\overline{U}_j(n)$ is provided to Code to Signal Generator 108.

The Code to Signal Generator 108 provides a signal output referred to as $S_j^A(t)$, and the Code to Signal Generator 10 provides a signal output referred to as $S_j^B(t)$. In the preferred embodiment, the optical signal outputs $S_j^A(t)$ and $S_j^B(t)$ are collectively transmitted as one or more optical signals. Thus, if the symbol $b_j$ is "1", then the encoder 100 transmits the unipolar optical code comprising $U_j(n)$ and $\overline{U}_j(n)$. If the symbol $b_j$ is "0", then the encoder 100 transmits the unipolar optical code comprising $\overline{U}_j(n)$ and $U_j(n)$.

It is noted that the encoder 100 may use either time or frequency domain encoding, and thus the unipolar words $U_j(n)$ and $\overline{U}_j(n)$ may comprise either time or frequency domain encoded representations. For time domain encoding, the unipolar outputs $U_j(n)$ and $\overline{U}_j(n)$ comprise time waveforms. For frequency domain encoding, the unipolar outputs $U_j(n)$ and $\overline{U}_j(n)$ comprise an amplitude spectrum of a frequency spectrum.

The Code to Signal Generators 108 and 110 essentially perform code to signal translating functions. In other words, the Code to Signal Generators or modulators 108 and 110 convert an abstract binary mathematical sequence to a specific optical signal, which is either time or frequency encoded. For frequency domain encoding, the Code to Signal Generators 108 and 110 each translate a code bit sequence into a frequency amplitude pattern. For time domain encoding, the Code to Signal Generators 108 and 110 each translate a code bit sequence into a single time multiplexed optical signal. In one embodiment of the invention, the encoder 100 includes a single on/off modulator at the output of the symbol source 106, and the encoder 100 also includes the code to signal translators or modulators 108 and 110 which perform the code to signal translating function.

The operation of the encoder 100 is generally as follows. Consider a bipolar sequence $x(n)$ of length or period N that takes either of two values. The bipolar sequence may be represented by the bipolar values $\{-1,1\}$. For example, binary codes or sequences are typically represented as $\{-1,1\}$ in the RF domain using the phase of an EM signal, as described above. The sequence $x(n)$ can be expressed as the difference of two unipolar sequences with the same period, say $u(n)$ and $\overline{u}(n)$, that each take values from $\{0,1\}$, where $u(n)$ is obtained from $x(n)$ by replacing each $-1$ with 0, and $\overline{u}(n)$ is the binary complement of $u(n)$. Thus:

$$x(n)=u(n)-\overline{u}(n), \text{ with } u(n)=[1+x(n)]/2 \text{ and } \overline{u}(n)=[1-x(n)]/2$$

Similarly, let $v(n)$ be the unipolar sequence obtained from a length N bipolar sequence $y(n)$ of period N. Then the periodic and aperiodic cross-correlation functions of $x(n)$ and $y(n)$ can be computed in terms of the unipolar cross-correlation functions as follows:

$$\theta_{x,y}(l) = \sum_{n=0}^{N-1} x(n)y(n+l) \qquad (1)$$

$$= [\theta_{u,v}(l) + \theta_{\overline{u},\overline{v}}(l)] - [\theta_{u,\overline{v}}(l) + \theta_{\overline{u},v}(l)]$$

$$C_{x,y}(l) = \begin{cases} \sum_{n=0}^{N-1-l} x(n)y(n+l), & 0 \leq l \leq N-1 \\ \sum_{n=0}^{N-1+l} x(n-l)y(n), & 1-N \leq l \leq 0 \\ 0, & |l| \geq N \end{cases}$$

$$C_{x,y}(l) = [C_{u,v}(l) + C_{\overline{u},\overline{v}}(l)] - [C_{u,\overline{v}}(l) + C_{\overline{u},v}(l)] \qquad (2)$$

A CDMA scheme that employs the above results is illustrated in FIG. 2. The transmitted symbols for the $j^{th}$ user are encoded by two intensity modulation waveforms arriving at the receiver:

$$S^A_j(t) = \lambda_j \left\{ \sum_{i=-\infty}^{\infty} \left[ b_{j,i} \sum_{n=0}^{N-1} U_j(n)\Pi_{Tc}(t-nT_c-iT) + \overline{b}_{j,i} \sum_{n=0}^{N-1} \overline{U}_j(n)\Pi_{Tc}(t-nT_c-iT) \right] \right\} \qquad (3)$$

$$S^B_j(t) = \lambda_j \left\{ \sum_{i=-\infty}^{\infty} \left[ b_{j,i} \sum_{n=0}^{N-1} \overline{U}_j(n)\Pi_{Tc}(t-nT_c-iT) + \overline{b}_{j,i} \sum_{n=0}^{N-1} U_j(n)\Pi_{Tc}(t-nT_c-iT) \right] \right\} \qquad (4)$$

where $b_{j,i}$ is the $j^{th}$ binary, $+1/0$, symbol; $\Pi_{Tc}(t)$ is the unit rectangular chip waveform that is zero outside $[0, T_c]$, $T$, $T_c$ are the symbol and chip duration, respectively, and $\lambda_j$ is the chip intensity. The signature words $U_j(n)$ and $\overline{U}_j(n)$ are obtained from a length-N bipolar codeword as described above. The above equations represent the time domain case, and it is noted that the signals $s_j^A(t)$ and $s_j^B(t)$ have a different representation in the frequency domain case.

The CDMA optical encoder 100 shown in FIG. 2 is based on the above results. The data symbols are encoded by the collective $u(n)$ and $\overline{u}(n)$ outputs input to the crossbar switch 112, which on/off modulate the signal source in two channels. Thus if, for example, symbol "1" is transmitted, then $u(n)$ is transmitted on channel A and $\overline{u}(n)$ is transmitted on channel B, and vice versa for "0".

Therefore, in the bipolar-equivalent coding method of the present invention, each bipolar code of length N is re-coded into two unipolar sequences/words of length N. Thus, a first bipolar code which represents a "1" is re-encoded into a unipolar code comprising two unipolar words referred to as U1 and U2. Likewise, a second bipolar code which represents a "0" is re-encoded into a unipolar code comprising two unipolar words referred to as V1 and V2.

In the preferred embodiment, the two unipolar words are the binary complement of each other, referred to as U and $\overline{U}$, (or U and U'). In this embodiment the individual chips in each word are arranged in the same order. In an alternate embodiment, the two unipolar words are not the binary complement of each other. It is noted that there may be some cases where it is advantageous to arrange the individual chips in a different order and thus not have the unipolar words be binary complements.

The two unipolar words U1 and U2 are preferably the binary complement of each other, i.e., U and U'. Thus the first bipolar code is represented as a first unipolar code, wherein the first unipolar code comprises the two unipolar words U & U'. The two unipolar words V1 and V2 are also preferably the binary complement of each other, i.e., V and V'. Thus the second bipolar code is represented as a second unipolar code, wherein the second unipolar code comprises the two unipolar words V & V'. In the system of the present invention, the two unipolar words U and U' are both sent to indicate a symbol, e.g. a "1", and the two unipolar words V and V' are both sent to indicate a "0".

In the preferred embodiment, the original two bipolar codes are complements of each other, and thus the unipolar codes U & U' and V & V' are also complements of each other, i.e., V & V' =U' and U. Thus, in this embodiment the first unipolar code comprises the two unipolar words U & U', and the second unipolar code comprises the two unipolar words U' and U. Thus, if the unipolar codes are complements of each other as described above, the two unipolar words U and U' are both sent to indicate a "1", and the two unipolar words U' and U are both sent to indicate a "0".

Therefore, the optimum choice between U1 & U2 that maximizes the system performance is to let U2 be the complement of U1, making the two ordered pairs (U, U') and (U', U) as distinct as possible and thus providing maximum discrimination between the binary values "1" and "0".

The two unipolar words comprising a unipolar code are preferably sent on two different optical fiber cables.

Alternatively, the two unipolar words are transmitted using different polarizations, or using time or frequency multiplexing (independently of whether each word is encoded in time or frequency). In one embodiment, each word is encoded in the optical frequency domain using adjacent frequencies for each word. Stated in another way, one unipolar code or sequence of length 2N is formed by concatenating the two words, either U and U', or V and V', and assigning adjacent frequency chips to each element of the sequence. However, it is noted that other transmission methods are possible. For example, in one embodiment the system interleaves the bits of the two words to form a 2N sequence. It is noted that particular arrangements or methods may reduce interference or nonlinear effects. Any of various arrangements, i.e., how each word is transmitted or sent, may be used, as long as the transmission method is consistent within the system and the receiver has knowledge of the transmission method.

FIG. 2A—Generalized Encoder Block Diagram Referring now to FIG. 2A, a generalized block diagram illustrating an encoder 100 according to the present invention is shown. As shown, the optical encoder 100 may be generalized as a device that has two inputs and one or more outputs. The inputs of the optical encoder 100 receive the binary data to be transmitted and the code command for code selection. The outputs of the optical encoder 100 provide the optical signals that carry the codes and data information. The optical encoder 100 includes optical source, code generators, data modulators/switches, as well as other signal processing elements. The optical code generator recieves an optical source input and produces an optical output that has certain temporal or spectral characteristics according to the code selection input. The outputs of the optical code generators, u1 & u2, are fed to a cross-bar switch controlled by the binary data input. As an example, as shown, if the binary value is "1", the ordered pair (u1,u2) is carried in the optical signal outputs. If the binary value is "0", then the ordered pair (u2,u1) is transferred in the optical signal outputs. In a more general scenario where the two unipolar codes are not binary complements of each other, the optical encoder 100 transmits a second unrelated ordered pair, say (u3,u4), if the binary value is "0". In the preferred embodiment, the two unipolar codes are binary complements, and the ordered pair (u1,u2) is sent if the binary value is "1" and the ordered pair (u2,u1) is sent if the binary value is "0".

As discussed above, the optimum choice between u1 & u2 that maximizes the system performance is to let u2 be the complement of u1, making the two ordered pairs as distinct as possible and thus providing maximum discrimination between the binary values "1" and "0". A bipolar sequence or code x is converted to a unipolar code by letting u1 be the unipolar sequence u obtained from x by replacing, say all the −1 with 0. Thus the ordered pairs carried by the optical signal outputs are now (u,u') if the binary data value is "1", and (u',u) if the binary data value is "0". It is noted that the order of the sequences, i.e., the order of the ordered pairs, is extremely important. The order can be maintained by using two separate fibers (spatial multiplexing), two polarizations (polarization multiplexing), two wavelengths (frequency multiplexing), two time periods (time multiplexing), or combinations thereof. Thus, other means of interleaving the unipolar word pair, instead of a simple ordering, can be used as long as they are consistent.

Thus each symbol value is assigned a unipolar code comprising a unipolar sequence or word pair, or a compound unipolar sequence, derived from a bipolar code. Therefore in a most general scenario with two distinct compound unipolar sequences, the two associated bipolar sequences are also distinct, one for each binary value. If the compound unipolar sequences are optimized, i.e., the unipolar codes are complements of one another, then the associated bipolar sequences are the negatives of one another.

FIG. 3—Decoder Block Diagram

Referring now to FIG. 3, a block diagram illustrating the optical decoder 130 according to the present invention is shown. As shown, the optical decoder 130 receives optical signals, i.e., the two signals $s_j^A(t)$ and $s_j^B(t)$, and decodes the two signals to determine the user code and the symbol source or transmitted data. The optical decoder 130 includes two power dividers 132 and 134 which receive the signals $s_j^A(t)$ and $s_j^B(t)$, respectively. The power divider 132 provides the received signal $s_j^A(t)$ to a matched filter $U_j(N-1-n)$ 142 and to a matched filter $\overline{U}_j(N-1-n)$ 146. The power divider 134 provides the received signal $s_j^B(t)$ to a matched filter $U_j(N-1-n)$ 148 and to a matched filter $\overline{U}_j(N-1-n)$ 144.

The matched filters $U_j(N-1-n)$ 142 and $\overline{U}_j(N-1-n)$ 144 form a complementary unipolar correlator pair, and the matched filters $U_j(N-1-n)$ 148 and $\overline{U}_j(N-1-n)$ 146 form a complementary unipolar correlator pair. The matched filters 142 and 148 are preferably identical, and the matched filters 144 and 146 are preferably identical. The matched filters 142, 144, 146 and 148 perform correlations with the received signals in order to reject signals intended for other possible users of the system, while detecting the signals intended for the user of the respective decoder. In general, the communications system will have many users each having his own code or signature sequence. Thus the correlations are performed to reject the codes of other users, while detecting the codes of the desired user.

The matched filters $U_j(N-1-n)$ 142 and $\overline{U}_j(N-1-n)$ 144 provide outputs to a summation unit 150 whose output is provided to a photodetector $PD_A$ 154. The matched filters $U_j(N-1-n)$ 148 and $\overline{U}_j(N-1-n)$ 146 provide outputs to a summation unit 152 whose output is provided to a photodetector $PD_B$ 156.

The two photodetectors or photodiodes 154 and 156 are connected in a balanced configuration so that their outputs are subtracted. The two photodetectors 154 and 156 operate to subtract the correlation values produced by the summation of the outputs of the matched filters $U_j(N-1-n)$ 148 and $\overline{U}_j(N-1-n)$ 146 from the correlation values produced by the summation of the outputs of the matched filters $U_j(N-1-n)$ 142 and $\overline{U}_j(N-1-n)$ 144. This operates to reject or remove interference caused by the codes of another user. The photodetectors 154 and 156 produce an output electrical signal.

A low pass filter (LPF) 158 is connected to the balanced output of the photodiodes 154 and 156 and low pass filters the output electrical signal. The output of the low pass filter 158 is provided through a sampling switch 160 to a detector 162. The output of the low pass filter 158 is a waveform having a certain shape. The sampling switch 160 ensures that the waveform output from the low pass filter 158 is sampled at the largest peak to obtain the maximum signal to noise ratio. The sampling switch 160 receives an output from a synchronization circuit (not shown) to ensure that the signal waveform from the lowpass filter 118 is sampled at the optimum time.

The detector 162 is a symbol detector/estimator for detecting and/or estimating the transmitted symbol. In one embodiment, the detector 162 is a threshold detector 162 which compares the sampled signal with respective thresholds and generates the detected symbol $\hat{b}_j$. The threshold detector 162 determines if the received waveform is a 1 or 0 value. Thus the threshold detector 162 uses the results of the threshold comparison to make a decision on the value of the binary symbol that the user had sent. The estimated symbol is denoted as $\hat{b}_j$.

Therefore, the received signals are decoded according to equations (1) and (2) with the unipolar matched filters, $U(N-1-n)$ and $\overline{U}(N-1-n)$, where the codeword U corresponds to one period of u(n). Thus, user j is decoded according to equations (1) and (2) above with two identical matched filter pairs. Each pair has two unipolar matched filters with impulse responses:

$$h_j(t) = \sum_{n=0}^{N-1} U_j(N-1-n)\Pi_{Tc}(t-nT_c), \text{ and}$$

$$\overline{h}_j(t) = \sum_{n=0}^{N-1} \overline{U}_j(N-1-n)\Pi_{Tc}(t-nT_c).$$

The outputs of each of the two complementary unipolar correlator pairs are optically summed and photodetected. As noted above, the two photodiodes 154 and 156 are connected in a balanced configuration so that their outputs are subtracted. The result is low-pass filtered and threshold-compared to zero to estimate the transmitted symbol.

FIG. 4—Differential Decoder

Referring now to FIG. 4, a block diagram illustrating an alternate embodiment of the decoder 130 is shown. The decoder 170 shown in FIG. 4 uses the fact that the two correlator pairs 142, 144 and 146, 148 of the decoder 130 are identical. The decoder 170 of FIG. 4 requires only one unipolar correlator pair and one photodetector, instead of requiring two unipolar correlator pairs and two photodetectors as in the embodiment of FIG. 3. In FIG. 4, elements similar or identical to elements in FIG. 3 have the same reference numerals for convenience.

As shown, the decoder 170 includes a unipolar correlator pair comprising correlator $U_j(N-1-n)$ 142 and correlator $\overline{U}_j(N-1-n)$ 144. The correlators 142 and 144 receive the transmitted signals $s_j^A(t)$ and $s_j^B(t)$, respectively. The signals $s_j^A(t)$ and $s_j^B(t)$ are transmitted at a first period of time on the respective channels, and the signals $s_j^A(t)$ and $s_j^B(t)$ are each then retransmitted on the opposite channel at a second later period of time.

The correlators 142 and 144 each provide outputs to a summation unit 150. The summation unit 150 sums the correlation outputs and provides an output to the photodetector 154. The photodetector 154 converts the received light signal into an electrical signal. The output of the photodetector 154 is provided to a low pass filter 158 and to a sampling switch 161 which has period T/2. The lowpass filter 158 filters out high frequency components of the electrical signal. The sampling 161 samples the electrical signal to obtain the largest SNR. The sampling switch 161 has a sampling period of T/2, which is half the sampling period of the embodiment of FIG. 3.

The signal output from the low pass filter 158 and sampling switch 161 is then provided to a symbol estimator unit or threshold unit 182 which determines the transmitted data values. The signal output from the low pass filter 158 and sampling switch 161 is also provided to a delay element $Z^{-1}$ 184. The output of the delay element Z' 184 is also provided to the comparator unit or symbol estimator unit 182. The symbol estimator unit 182 compares the two signal inputs and makes a decision, based on the comparisons, on the value of the transmitted binary symbol. In other words, the symbol estimator unit 182 estimates the transmitted symbol. The output of the symbol estimator unit 182 is provided to a down sampling block 186. The down sampling block 186 operates to ignore every other bit of the transmission. The down sampling block 188 then outputs the estimate of the value of the binary symbol that the user had sent.

It is noted that a particular case of the above general schemes described in FIGS. 2, 3, and 4, for which Uj is a unit sequence of value 1, is equivalent to the binary PPM or non-coherent FSK modulation system.

FIGS. 5 and 6—Optical Implementation

Referring now to FIGS. 5 and 6, optical implementations of encoder 100 and decoder 130, referred to as encoder 100A and decoder 130A, respectively, are shown. FIGS. 5 and 6 are schematic diagrams of an optical or grating-based spectral encoder and decoder, respectively.

FIG. 5—Optical Encoder

Figure 5A:
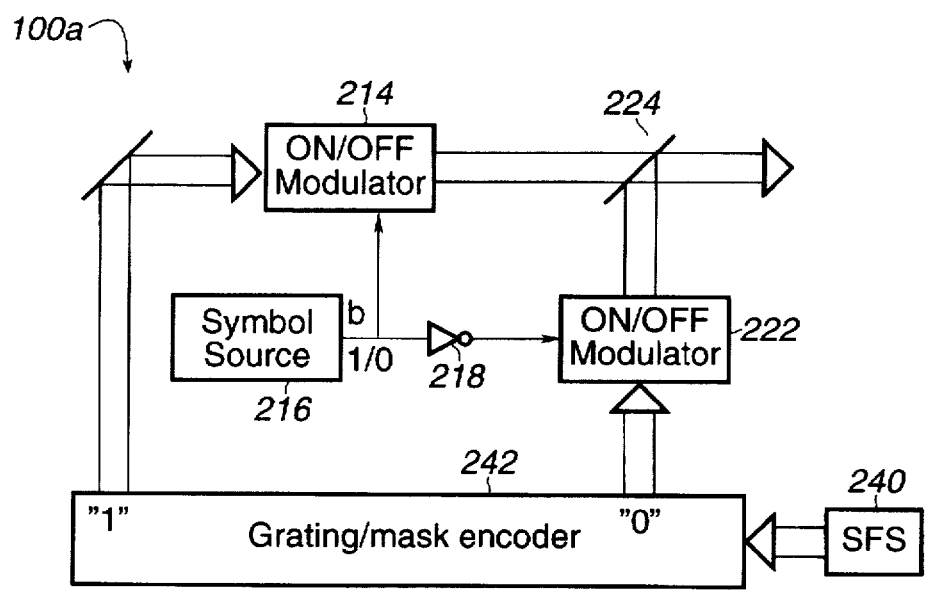
FIGS. 5A and 5B are a block diagram and schematic diagram, respectively, of a grating-based spectral optical encoder which generates optical signals using bipolar codes according to the present invention.
Figure 5B:
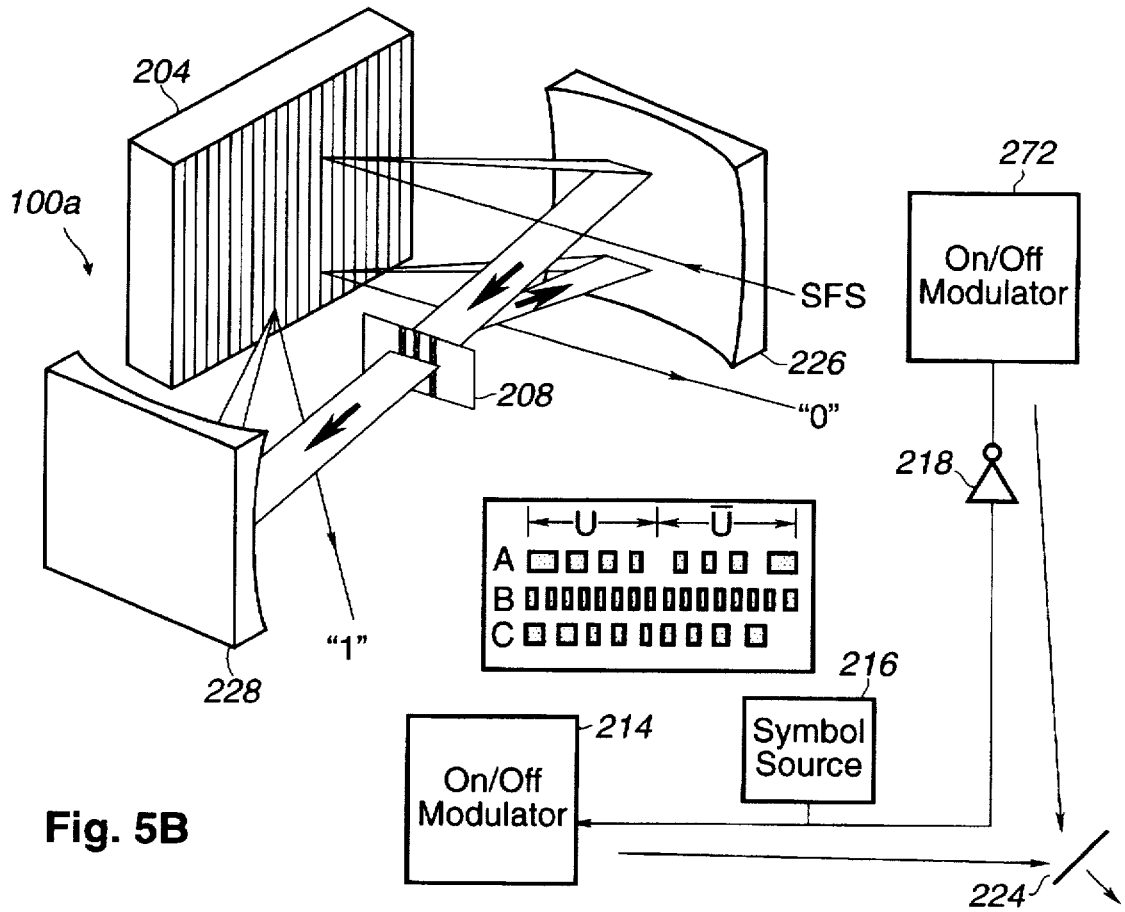

Referring now to FIG. 5, an optical encoder 100A is shown. FIG. 5A is a block diagram of the optical encoder 100A, and FIG. 5B illustrates the actual optical components comprising the encoder 10A. As shown, in the preferred embodiment, the encoder uses a broadband source, such as a superfluorescent fiber source (SFS) 240. The broadband source 240 is preferably an erbium-doped SFS. However, it is noted that other types of broadband sources may be used, as desired.

Referring to FIG. 5A, the broadband source 240 is provided to an encoder 242. The encoder 242 is preferably a grating/mask encoder 242. However, it is noted that other types of encoders may be used, as desired. The grating/mask encoder 242 produces two spectrally encoded light patterns, referred to as first and second optical signals, which correspond to the compound unipolar code pairs ($U_j$, $\overline{U}_j$) and ($\overline{U}_j$, $U_j$). The term (u, u') denotes a concatenation of u and u' to obtain a length 2N unipolar code. However, it is noted that other means of interleaving u and u' may be used, as desired.

In one embodiment, the grating/mask encoder 242 includes two encoders, where each encoder includes a dispersing grating and a spatial amplitude mask. In the preferred embodiment, the encoder 242 includes a single encoder or optical mask, as discussed below. The grating/mask encoder 242 generates the particular user's code for CDMA communication. As discussed above, the grating/mask encoder 242 generates two unipolar words or unipolar optical sequences which collectively form a unipolar code. The unipolar code has bipolar code properties and preferably represents a bipolar code. Thus the encoder 100A of the present invention represents a bipolar code as a compound unipolar code comprising two unipolar optical words or sequences $U_j(n)$ and $\overline{U}_j(n)$. The two unipolar optical words or sequences $U_j(n)$ and $\overline{U}_j(n)$ are preferably complements of each other and are each half the length of the compound unipolar code.

The "1" or (u, u') output of the grating/mask encoder 242, referred to as the first unipolar signal, is provided to an ON/OFF modulator 214, and the "0" or (u', u) output of the grating/mask encoder 242, referred to as the second optical signal, is provided to an ON/OFF modulator 222. As noted above, the second optical signal is the complement of the first optical signal.

The symbol source 216 provides a symbol code or data bit values to the ON/OFF modulator 214 and provides the symbol code through an inverter 218 to the ON/OFF modulator 222. The outputs of the ON/OFF modulators 214 and 222 are provided through a beam splitter 224 and are provided as outputs of the spectral encoder 100A.

The function of the ON/OFF modulators 214 and 222, as well as inverter 218 and beam splitter 224 is to allow only the transmission of either the "1" or "0" output of the encoder 242, but not both, as the spectral encoder output according to the value of the symbol from the SFS 240. It is noted that other configurations whereby the SFS 240 is modulated by the symbol source 216 may be used, as desired.

Referring now to FIG. 5B, a grating-based optical encoder is shown. As shown, the encoder 200 includes a frequency dispersing element. In the present disclosure, the term "frequency dispersing element" is intended to include any type of element or structure which disperses or separates the frequencies of an optical signal or light. In the preferred embodiment, the frequency dispersing element 204 comprises a dispersive grating 204. The dispersive grating 204 operates to receive the optical signal or light beam and generate a dispersed light beam having separated frequency components. In other embodiments, the frequency dispersing element 204 comprises a prism, an array of waveguides, an interferometer, or dispersive transmission lines, among others. It is also noted that the grating 204 may be curved to perform both dispersion and focusing functions. This eliminates the requirement of curved mirrors.

The dispersive grating 204 transmits the dispersed light beam to a first mirror 226. The first mirror 226 receives the dispersed light beam and directs the dispersed light beam to an optical mask 208. The optical mask 208 operates to encode a "1" or "0" value using a unipolar code. The optical mask 208 is preferably able to generate either one of two unipolar codes, wherein a first unipolar code represents a "1" and a second unipolar code represents a "0" value. The two unipolar codes are preferably complements of each other, but are not required to be. The mask 208 preferably includes transmitting portions (holes) for encoding the optical signals, and also preferably includes reflecting portions. The mask 208 may also include absorbing portions which absorb light portions to reduce overlap.

The mask 208 may use other means to encode data onto the light beam. For example, in one embodiment, the different sections or portions of the mask 208 instead effect the polarization, or the angle of propagation, or other properties of the light passing through or reflecting off the mask 208. The mask 208 may also comprise an active element, capable of changing in response to, for example, applied voltages. In other words, the mask 208 may comprise a spatial array of light modulators. For the encoder or sender, the mask 208 could incorporate both encoding and modulator functions. In the preferred embodiment, the optical mask 208 is preferably a spatial amplitude mask.

The spatial amplitude mask 208 receives the light beam and produces first optical signals including the first unipolar code, and the mask 208 produces second optical signals including the second unipolar code. The spatial amplitude mask 208 preferably comprises a reflective material, preferably aluminum, and includes a plurality of holes. A transmitted portion of the dispersed light beam passes through the spatial amplitude mask 208 and a reflected portion of the dispersed light beam is reflected from the spatial amplitude mask 208. The spectral bands, or chips, of the dispersed light beam are selectively transmitted through the mask 208. The mask 208 reflects some of the colors or frequencies and allows other colors or frequencies to pass through.

Thus the spatial amplitude mask 208 spectrally encodes the unipolar codes onto the light. The plurality of holes operate to encode a first unipolar code on the dispersed light beam, i.e., on the transmitted portion of the dispersed light beam, to produce the first optical signals. The unipolar code comprised in the first optical signals is referred to as U & U'. The spatial amplitude mask 208 also operates to reflect a portion of the dispersed light beam, which encodes the second unipolar code on the reflected portion of the dispersed light beam to produce the second optical signals. The unipolar code comprised in the second optical signals is referred to as U' and U. The second unipolar code thus comprises a unipolar complement of the first unipolar code. Thus the optical mask 208 generates the first and second optical signals, wherein the first and second optical signals each include unipolar codes which correspond to respective bipolar codes.

It is noted that the two unipolar optical codes may or may not be complements or the negative of each other. If the two bipolar codes are negative or complements of each other, which is common and preferred, then the two unipolar optical codes are also complements of each other.

Thus the optical mask 208 generates the two unipolar codes which each correspond to a bipolar code. As noted above, in prior art RF systems which use CDMA communication, the bipolar code being transmitted is represented as either of two electromagnetic signals which are 180 degrees out of phase with respect to each other.

Thus CDMA systems in the RF domain use bipolar +1/−1 codes or signature sequences to distinguish among users. As discussed above, this has not been possible in the optical domain due to the unipolar nature of optical signals and the direct detection methods used.

The present invention overcomes this problem and provides an optical CDMA communication system which uses unipolar codes which have bipolar code properties.

A second mirror 228 receives the first optical signals comprising the transmitted portion of the dispersed light beam which passes through the optical mask 208. The second mirror 228 directs the first optical signals to the dispersive grating 204. The dispersive grating 204 operates to collate the frequency components of the first optical signals, i.e., the transmitted portion of the dispersed light beam, into a single optical signal and transmits this optical signal to the first on/off modulator 214.

The first mirror 226 receives the second optical signals comprising the reflected portion of the dispersed light beam which is reflected from the optical mask 208. The first mirror 226 directs the second optical signals to the dispersive grating 204. As noted above, the dispersive grating 204 operates to collate the frequency components of the second optical signals, i.e., the reflected portion of the dispersed light beam, into a single optical signal, and transmits this optical signal to the second on/off modulator 222.

The encoder 100A accepts the symbol source 216 which generates the data intended to be transmitted. The first on/off modulator 214 is coupled to the symbol source 216 and receives the data intended for transmission. The first on/off modulator 214 is also optically coupled to the dispersive grating 204 and receives the first optical signals. The first on/off modulator 214 selects the first optical signals if the data intended for transmission from the symbol source 216 is a "1" value.

The second on/off modulator 222 is coupled to the symbol source 216 through an inverter 218 and receives the inverted version or complement of the data intended for transmission. The second on/off modulator 222 is also optically coupled to the dispersive grating 204 and receives the second optical signals. The second on/off modulator 214 selects the second optical signals if the data intended for transmission from the symbol source 216 is a "0" value.

One of the first on/off modulator 214 and the second on/off modulator 222 generate either the first or second optical signals which comprise the first and second unipolar codes, respectively. The first and second optical signals include the data intended for transmission and also identify a user.

Thus the spatial amplitude mask 208 allows transmission of a first portion of the light through the mask 208 to a second mirror 228. The spatial amplitude mask 208 also reflects a second portion of the light back to the first mirror 226, wherein the second portion or the reflected light is the complement of the first portion or the transmitted light.

The mask pattern of the spatial amplitude mask 208 corresponds to the first unipolar code which identifies a binary value of the respective user of the encoder. The reflection from the mask pattern corresponds to the second unipolar code and identifies the other binary value of the respective user Thus the encoder 200 requires only a single grating 204, two mirrors 226 and 228, and a single mask 208.

Thus at least a portion of the spectrum of the SFS is encoded using a grating and an amplitude mask according to the pattern of the concatenated unipolar code $U \oplus \overline{U}$, where U is obtained from a length-N bipolar code, x(n), by replacing each −1 with 0, and $\overline{U}$ is the binary complement of U. The binary information symbol from the symbol source 216, i.e., digital data which takes the values 1/0, modulates the two beams encoded with $U \oplus \overline{U}$ and $\overline{U} \oplus U$, respectively.

In an alternate embodiment, the encoder 100A includes first and second spatial amplitude masks. The first spatial amplitude mask receives the light beam and produces the first optical signals including the first unipolar code. The first spatial amplitude mask includes a first plurality of holes, and the first plurality of holes operate to encode a first unipolar code on the light beam to produce the first optical signals.

Likewise, the second spatial amplitude mask receives the light beam and produces the second optical signals including the second unipolar code. The second spatial amplitude mask includes a second plurality of holes, and the second plurality of holes in the second spatial amplitude mask operate to encode a second unipolar code on the light beam to produce the second optical signals. In this embodiment, two optical masks are used to encode first and second unipolar codes which are not complements of each other. In an other embodiment, the holes in the second spatial amplitude mask are a complement of the first plurality of holes in the first spatial amplitude mask, and the second unipolar code is a complement of the first unipolar code.

It is noted that, in this encoder embodiment having first and second spatial amplitude masks, the encoder does not use reflected portions of the respective masks, and thus the spatial amplitude masks are not required to be constructed of reflective material.

In the preferred embodiment of the invention, the user transmits the 2N sequence U&U' to indicate a "1". This optical frequency pattern is produced by passing the dispersed source spectrum through mask 208. The open holes in the mask 208 represent the ones in the 2N sequence, and all other frequencies are blocked or reflected. The light that passes through the mask 208 is the signal labeled "1" in FIG. 5B. If, on the other hand, the user wants to send a "0" symbol, then a second bipolar code is required. The bipolar-equivalent re-coding procedure of the present invention applied to this second bipolar code results in two new unipolar words each of length L, referred to as V and V'. In general, U and V are not necessarily related, and in this case a second mask is required to form the signal V&V'. In the preferred embodiment where the first and second bipolar codes are complements of each other, the unipolar codes U and V are also complements of each other.

Therefore, as noted above, in the preferred embodiment the present invention follows the usual RF convention and uses a bipolar code and its complement to represent a "1" and a "0", respectively. In this embodiment, a bipolar code is used for a "1", and the negative or complement of this bipolar code is used for a "0". Thus V=U' and V'=U. The 2N sequence for a "0" is the binary complement of the 2N sequence for a "1", and each 2N sequence is composed of two binary complement unipolar N-length halves. Thus, given one unipolar sequence of length N, referred to as U, the system can form the desired bipolar codes, including the 2N sequence U&U' for a "1", and the 2N sequence U'&U (=V&V') for a "0".

The methods used to translate these codes or sequences into optical signals depends on the signaling method used. In the preferred embodiment, the frequency chips transmitted by the mask 208 represent the sequence U&U', a "1" signal, and the chips blocked or reflected represent the complement, U'&U, or a "0" signal. Instead of using a second mask (with complementary holes) to form LT&U in transmission, the preferred embodiment uses mask 208 that reflects the blocked chips to provide the U'&U signal. The reflected chips or portions of the optical signal comprise the signal labeled "0" in FIG. 5B.

In another embodiment, the system uses a mask of length N that only produces U in transmission and U' in reflection. In this embodiment, neither output beam from the length N mask is a complete code, and both are required to be sent. The two output beams are sent in a particular configuration to distinguish between a "1" and a "0". For example, the system time delays or time multiplexes the output beams, e.g.,: for a "1", first send U and then U'; for a "0", first send U' and then U (FIG. 4).

Optical Decoder

Figure 6A:
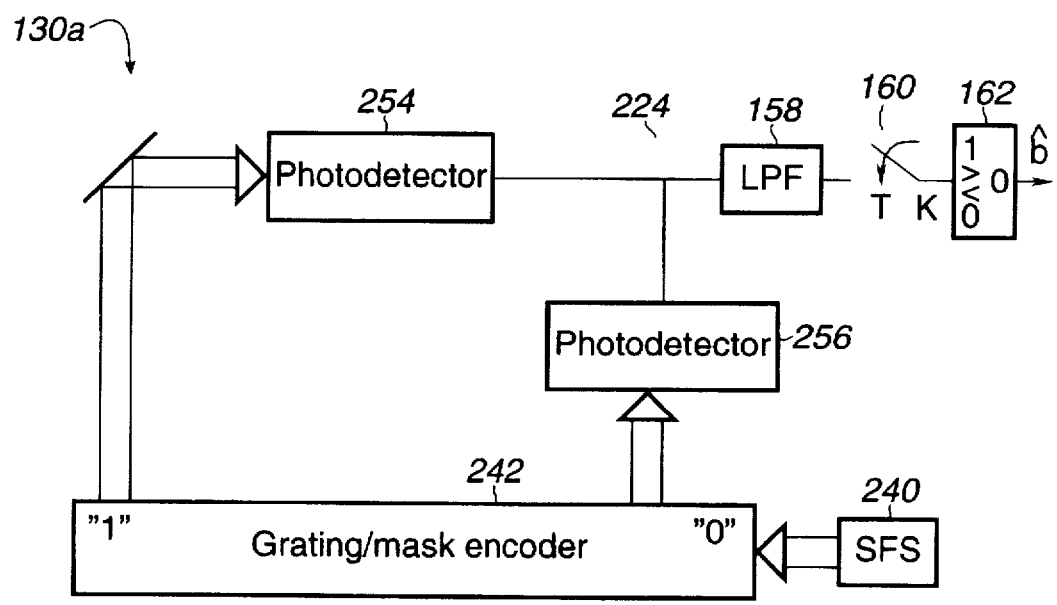
FIGS. 6A and 6B are a block diagram and schematic diagram, respectively, of a grating-based spectral optical decoder which receives and decodes optical signals encoded with bipolar codes according to the present invention.
Figure 6B:
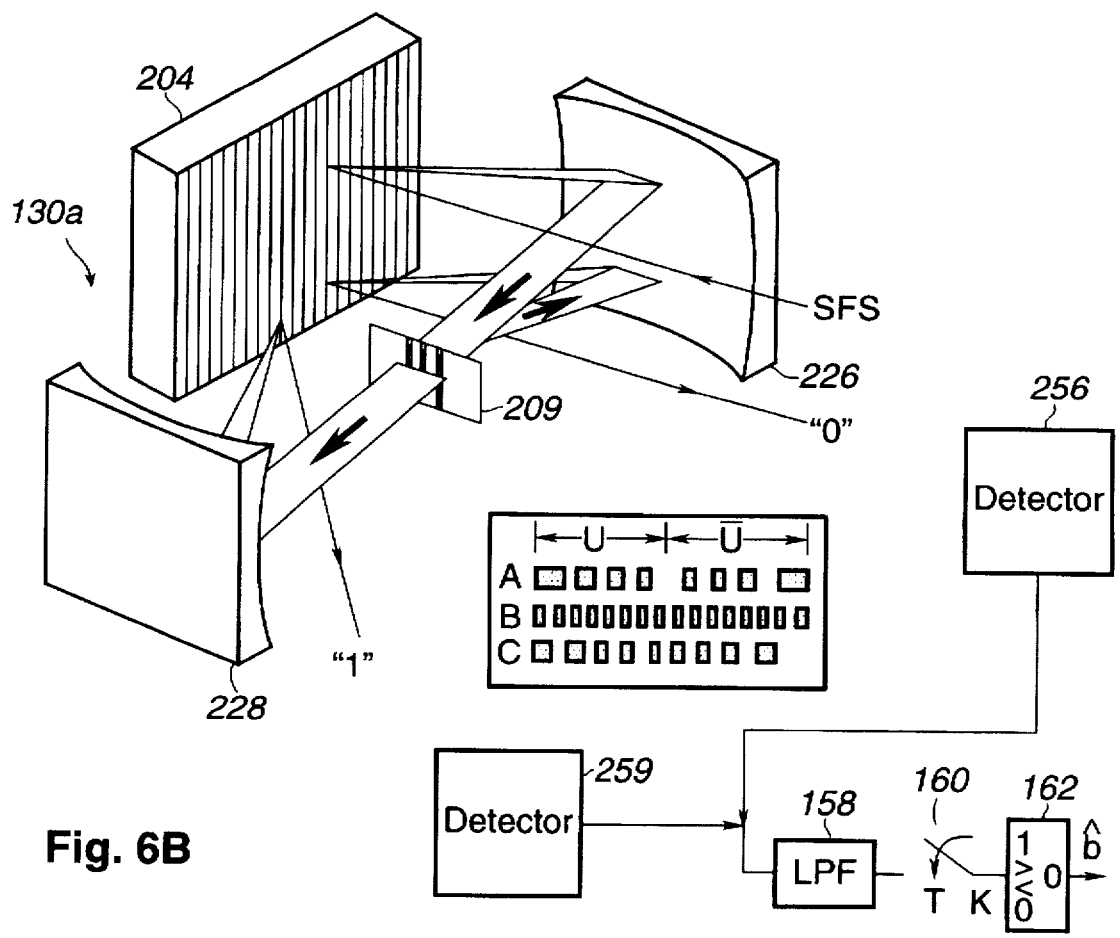

Referring now to FIG. 6, an optical decoder 130A is shown. FIG. 6A is a block diagram of the optical decoder 130A, and FIG. 6B illustrates the actual optical components comprising the optical decoder 130A. As shown, in the preferred embodiment the decoder 130A receives one or more optical signals coupled from the fiber network 80 or fiber medium 82, such as the one or more optical signals generated by the encoder of FIG. 5. The received optical signals carry a unipolar code unique to a respective individual user and also representing the binary data.

The one or more optical signals are provided through a grating/mask decoder 243. The grating/mask decoder 243 correlates the received optical signals with the compound unipolar codes (u, u') and (u', u) of a user. In one embodiment, the grating/mask decoder 243 includes two decoders, where each decoder includes a dispersing grating and an optical mask. In the preferred embodiment, the decoder 243 includes a single optical mask, as discussed below. The grating/mask decoder 243 decodes a particular user's code for CDMA communication. As discussed above, the grating/mask decoder 243 generates correlation values by spectrally correlating the received signal with the two compound unipolar codes of the user, wherein the two compound unipolar codes represent two bipolar codes.

As noted above, the two bipolar codes are preferably the complement or negative of each other. Thus the decoder 230 of the present invention detects for two unipolar codes which represent a user's bipolar codes, wherein the two unipolar codes comprise either the combination of $\{U_j(n)$ and $\overline{U}_j(n)\}$ or the combination $\{\overline{U}_j(n)$ and $U_j(n)\}$.

The "1" or (u, u') output of the grating/mask encoder 243 is provided to a photodetector 254 and the "0" or (u', u) output of the grating/mask encoder 243 is provided to a photodetector 256. The photodetectors 254 and 256 each output respective electrical signals corresponding to the light beam received at each of the photodetectors 254 and 256. As discussed above, the two photodetectors 254 and 256 are preferably connected in a balanced configuration so that their outputs are subtracted. This operates to reject or remove interference caused by the codes of another user.

A low pass filter 158 is connected at the output of the balanced photodetectors 154 and 156. The output of the low pass filter 158 is provided through a sampling switch 160 to a detector 162. The output of the low pass filter 158 is a waveform having a certain shape. The sampling switch 160 ensures that the waveform output from the low pass filter 158 is sampled at the largest peak or energy to obtain the maximum signal to noise ratio. The sampling switch 160 receives an output from a synchronization circuit (not shown) to ensure that the signal waveform is sample at the optimum time.

The detector 162 determines the sign and/or magnitude of the decoder output and estimates the signal sent. It is noted that the detector may comprise any of various systems or devices for detecting or determining the decoder output and/or estimating the sent signal. In the preferred embodiment, the detector 162 includes a threshold detector 162 for detecting the magnitude of the decoder output. The detector 162 may also include other logic, as desired.

The threshold detector 162 compares the received signal with respective thresholds and generates the detected symbol b. The threshold detector 162 determines if the received waveform is a 1 or 0 value. Thus the decoder 130A outputs the transmitted data.

Referring now to FIG. 6B, a grating-based optical decoder 130A is shown. Elements in FIG. 6B which are preferably similar or identical to elements in FIG. 5B or is FIG. 3 have the same reference numerals for convenience. As shown, the optical decoder 130A includes a frequency dispersing element 204, preferably a dispersive grating 204. The dispersive grating 204 receives optical signals transmitted from another user on the network. The received optical signals include a unipolar code which identify a user as well as include transmitted data. The dispersive grating 204 generates a dispersed light beam having separated frequency components in response to the received optical signals. The dispersive grating 204 generates the dispersed light beam to a first mirror 226. The first mirror 226 receives and redirects the dispersed light beam to an optical mask 209.

The decoder 130A includes at least one optical mask 209. The optical mask 209 is preferably similar to the optical mask 208 of FIG. 5B, but may include a more complex or different mask pattern. The mask pattern of the spatial amplitude mask 209 preferably corresponds to the unipolar code which identifies the respective user of the decoder 130A. In one embodiment, the mask 208 comprises a spatial array of light modulators, which thus allows the decoder to change the mask 209 to detect different users.

The optical mask 209 receives the dispersed light beam from the first mirror 226. The optical mask 209 is preferably a spatial amplitude mask 209 for correlating or decoding the received optical signals with the respective unipolar code. The spatial amplitude mask 209 generates two optical signals, wherein the two optical signals comprise a first optical signal and a second optical signal. As discussed below, the first and second optical signals correspond to transmitted and reflected portions of the light beam relative to the optical mask 209, and represent correlation outputs of the mask 209 using the two unipolar codes which the decoder 130A is designed to detect.

The spatial amplitude mask 209 comprises a reflective material and includes a plurality of holes, wherein a transmitted portion of the dispersed light beam passes through the optical mask 209 and a reflected portion of the dispersed light beam is reflected from the optical mask 209. The plurality of holes in the optical mask 209 operate to decode or correlate a unipolar code from the transmitted portion of the dispersed light beam to produce the first optical signal. The optical mask 209 also operates to correlate or decode a second unipolar code from the reflected a portion of the dispersed light beam to produce the second optical signal. The second optical signal, i.e., the reflected portion of the dispersed light beam from the optical mask 209, comprises a complement of the first optical signal, i.e., the transmitted portion of the dispersed light beam through the optical mask 209. Thus the spectral bands, or chips, comprising the dispersed light beam are selectively transmitted through the mask 209. The mask 209 thus reflects some of the colors or frequencies and allows other colors or frequencies to pass through. Thus the spatial amplitude mask 209 spectrally correlates or decodes information from the light.

The optical decoder 130A includes a second mirror 228 which receives the first optical signals comprising the transmitted portion of the dispersed light beam that passes through the optical mask 209. The second mirror 228 directs the first optical signals to the dispersive grating 204. The dispersive grating 204 then collates the frequency components of the light beam back together and retransmits the light beam to the photodetector 254.

The first mirror 226 receives the second optical signals comprising the reflected portion of the dispersed light beam, which is reflected from the optical mask 209. The first mirror 226 directs the second optical signals to the dispersive grating 204. The dispersive grating 204 then collates the frequency components of the light beam back together and retransmits the light beam to the photodetector 256.

The optical decoder 130A includes the first photodetector 254 which receives the portion of the light beam from the dispersive grating 204 that was transmitted through the optical mask 209, referred to as the first optical signal. The first photodetector 254 converts the first optical signal into a corresponding first electrical signal. The optical decoder 130A also includes a second photodetector 256 which receives the portion of the light beam from the dispersive grating 204 that was reflected from the optical mask 209, referred to as the second optical signal. The second photodetector 256 converts the second optical signal into a corresponding second electrical signal.

As mentioned above, the photodetectors 254 and 256 are preferably connected such that their outputs are subtracted. Thus the second electrical signal is subtracted from the first electrical signal to produce an output electrical signal. It is noted that two photodetectors 254 and 256 are needed because optical signals cannot be effectively subtracted. The output electrical signal is provided through a low pass filter 158 and a sampling switch 160 to a detector 162. The operation of the low pass filter 158 and sampling switch 160 were described above.

As described above, the detector 162 determines the sign and/or magnitude of the decoder output and estimates the signal sent. It is noted that the detector may comprise any of various systems or devices for detecting or determining the decoder output and/or estimating the sent signal. In the preferred embodiment, the detector 162 includes a threshold detector 162 for detecting the magnitude of the decoder output. The detector 162 may also include other logic, as desired. The threshold detector 162 thus receives the output electrical signal and detects the transmitted data comprised in the output electrical signal.

Thus the decoder 130A requires only a single grating 204, two mirrors 226 and 228, and a single mask 209. Also, as shown, the optical decoder 130A is functionally similar to the optical encoder 100A. The amplitude mask pattern corresponds to the desired user's codes. The two beams are coupled to a balanced photodetector pair, and the balanced current output computes the true bipolar correlation of X and Y.

FIGS. 5 and 6 also illustrate the mask patterns of one length 16 code and two length 32 codes from bipolar Walsh codes of length 8 and 16, denoted A, B, and C, respectively. The chip widths vary to compensate for the non-uniform source spectrum, as shown in FIG. 7. Thus the per chip power is uniform, as required by the coding.

FIG. 7 illustrates an example encoded spectrum at the decoder 130A. As shown, the example encoded spectrum at the decoder 130A lines up with the encoding mask.

This indicates proper alignment of the encoder 100A and decoder 130A apparatus. Thus, the encoder 100A and decoder 130A are optically matched in terms of dispersion characteristics, which is important for proper operation.

It is noted that FIGS. 5 and 6 illustrate a spectral optical encoder 100A and decoder 130A. In an alternate embodiment, as noted above, the encoder 100A and decoder 130A use time domain techniques, such as a fiber tapped delay line, instead of spectral techniques.

The encoder 100A and decoder 130A preferably comprise passive optical components as described above with respect to FIGS. 5B and 6B, which greatly increases speed and performance. The use of all optical components removes any bottlenecks due to the speed of electronics components. Thus the encoder 100A and decoder 130A operate regardless of data transfer rates and the number of users. The electronics comprised in the system are not dependent on the data transfer rate or the number of users, but rather the electronics are only required to follow the user rate. The grating-based encoding and decoding apparatus shown in FIGS. 5 and 6 also preferably employ the optical elements in a compact and minimal configuration.

It is noted that the encoder 100A and decoder 130A may comprise electronic components for performing portions of the above functions. For example, in one embodiment the decoder 130A performs all the necessary correlations non-optically, specifically electronically. In this embodiment, the decoder 130A includes an array of optical detectors at the focus of the mirrors to measure the energy in every chip. The decoder 130A then performs the calculations electronically to determine the signal sent. For example, in one embodiment the decoder 130A includes a digital signal processor (DSP), or a general purpose CPU, which executes software to perform the calculations, or performs other fuinctions. It is noted that electronic correlation may be preferred in a time-domain system with long codes but moderate speeds, instead of a tapped delay line. Thus either the encoder 100A andlor the decoder 130A may include a DSP or CPU which performs certain of the functions of the encoder and decoder, respectively.

Optical Spectral Encoder—Two Optical Masks

Referring now to FIG. 8, an all-optical spectral encoder 100B is shown which includes two optical masks. The embodiment of FIG. 8 is similar to the embodiment of FIG. 5B, but includes four dispersing gratings and two optical masks. Elements in FIG. 8 which are preferably similar or identical to elements in FIG. 5B have the same reference numerals for convenience.

As shown, the encoder 100B receives a broadband source. The broadband source is provided through a beam splitter 302 to a dispersing grating 304. The spectrum of the broadband source is angularly dispersed by the frequency dispersive element 304. As noted above, the frequency dispersive element 304 may be, any of various types of elements or structures which disperses frequencies from an optical signal or light beam. In the preferred embodiment, the frequency dispersing element 304 comprises a dispersive grating 304. In other words, the dispersive grating 304 spreads out the light into different frequency components. The dispersive grating 304 is preferably similar to the dispersive grating 204.

The spectrum of the broadband source is then focused through a lens 306 onto a spatial amplitude mask 308. The spectral bands, or chips, are selectively transmitted through the mask 308. The mask 308 thus blocks some of the colors or frequencies and allows other colors or frequencies to pass through. Thus the spatial amplitude mask 308 spectrally encodes information, i.e., a unipolar code, onto the light to produce first optical signals. The first optical signals are then again focused through a lens 310 and recombined by a recombining grating 312. The mask pattern of the spatial amplitude mask 308 represents the concatenated codewords $U \oplus \overline{U}$ of length 2N. The dispersing grating 304, the spatial amplitude mask 308, and the recombining grating 312, as well as the two lenses 306 and 310, are collectively referred to as encoder $E(\lambda)$ 303.

The broadband source is also provided to a second encoder referred to as $\overline{E}(\lambda)$ 320. The encoder $\overline{E}(\lambda)$ 320 is similar in construction to the encoder $E(\lambda)$ 303. The second encoder $\overline{E}(\lambda)$ 320 has the complement mask pattern and encodes $\overline{U} \oplus U$ to produce second optical signals. The outputs of the respective encoders $E(\lambda)$ 303 and $\overline{E}(\lambda)$ 320, the first and second optical signals, are provided to respective ON/OFF modulators 214 and 222, respectively.

A symbol source 216 provides a symbol code to the ON/OFF modulator 214 and provides the symbol code through an inverter 218 to the ON/OFF modulator 222. The ON/OFF modulator 214 and the ON/OFF modulator 222 select either the first or second optical signals. The outputs of the ON/OFF modulators 214 and 222 are combined through a beam splitter 224 which provides the output of the spectral encoder 100B.

The two beams generated by elements 303 and 320 can also be generated with a single 2-D mask by stacking the two mask patterns. Alternately, a single 1-D reflecting mask can be used to provide $U \oplus \overline{U}$ in transmission and $\overline{U} \oplus U$ in reflection, as discussed about with reference to FIG. 5B. This configuration can be efficient since all of the spectral power is utilized.

Spectral and Temporal Encoding

The encoder 100 and decoder 130 of the present invention are preferably implemented with all-optical components, preferably using either time or spectral encoding methods. In the preferred embodiment, spectral encoding methods are used for transferring the data or information. In the preferred embodiment, the invention uses an optical mask, such as a spatial amplitude mask, that includes many openings or channels, referred to as chips. For example, one embodiment uses an optical mask with 1000 openings for 1,000 chips. Spectral encoding methods offer several advantages because the temporal nature of the data symbols is largely decoupled from the spectral nature of the codes. This enables the system electronics to operate at the symbol rate, while making full utilization of the source bandwidth. Since spectral code correlations are synchronous, Walsh codes can be used to provide orthogonality between users. Moreover, if the code has small offset periodic autocorrelation values, the cyclic shifts of the code can be assigned to different users. For example, the two-valued autocorrelation property of the m-sequence can result in considerable simplification and lead to an optical CDMA system. With bipolar Gold codes, all N cyclic shifts of each of the codewords can be used to produce a code book of size N(N+2). This is very desirable in applications that must support a large pool of subscribers with bursty access to the network.

Alternatively, the spectrally encoded optical system includes an array of different lasers for different colors or wavelengths instead of one or more spatial amplitude masks.

The lasers for different colors or wavelengths are alternately turned on and off to produce the spectral encoding. In other words, spectral encoding is performed by turning on and off different sets of lasers to achieve different colors or wavelengths. It is noted that, for this embodiment to provide the equivalent of 1,000 chips, the laser array would require 1,000 different lasers that are very close in wavelength. This is generally difficult and/or impractical with multiple separate lasers, i.e., it is difficult to keep the multiple lasers locked at the proper frequency. In this embodiment, decoding is preferably still performed using a spatial amplitude mask.

In an alternate embodiment, a time encoded system is used for the encoder. In this embodiment, the encoders are preferably realized with a short-pulsed source and fiber tapped-delay lines. For more information on a short-pulsed source and fiber tapped-delay lines, please see J. Salehi, "Code division multiple-access techniques in optical fiber networks—part I: Fundamental principles" IEEE Trans. Commun., 1989, 37, (8), pp. 824–833.

Thus the optical CDMA system can be realized both in time or frequency domain encoding with all-optical components. The unipolar encoders and correlators preferably use spectral encoding methods for encoding the unipolar codes and data on the light pulses. Where time domain encoding methods are used, the unipolar correlators can also be realized with fiber tapped-delay line filters that are matched to the codewords.

The ability to use all-optical components is extremely important in practice because the symbol rates of the individual users are far less than the bandwidth of the optical fiber. Frequency domain or spectral amplitude encoding significantly increases the number of available codewords that can be assigned to the subscribers in applications such as a fiber optic local area network. Frequency domain encoding directly manipulates the amplitude spectrum of the transmitting light source so that the spectral nature of the code and the temporal nature of the information symbol are essentially decoupled. This allows variable transmission rates for different symbol sources, a distinctly desirable capability in a multi-user network.

In the above embodiments, the optical communication system requires one or more channels, preferably two channels, for each user. The two channels can be distinguished with two wavelengths, or two orthogonal polarizations, or simply by time-multiplexing.

Depending on the transmission method, the received signals are accordingly separated, and delayed if time-multiplexed, prior to the correlation operations.

Broadband Light Source

The encoder uses simple, broadband and incoherent light sources that are compact and efficient. These incoherent sources, notably the superfluorescent fiber source (SFS) with its amplified spontaneous emission, have the limiting signal to noise ratio (SNR) characteristics associated with thermal light. The prevailing Gaussian assumption predicts a performance floor for communication systems using such a light source. The actual performance however depends on the true noise statistics. Noise current measurements of the photodetector illuminated by an erbium-doped SFS indicate that the noise distribution follows a negative binomial probability mass function that describes the photoelectron counting statistics of thermal light. This is consistent with the statistical model of the SFS as a thermal light source. The analysis shows that the system performance improves as the received power increases, despite the limiting SNR that is proportional to the ratio of the spectral bandwidth and the symbol rate. This has significant implication for practical spectral amplitude encoding CDMA systems.

An erbium-doped superfluorescent fiber source pumped by a diode laser can produce a few miliwatts of output power in a single spatial mode having almost 30nm of bandwidth at 1.55 micrometers or microns. Using reasonable grating sizes, an encoder having 256 spectral chips can be realized. This could support 128 orthogonal users using Walsh codes, or a pool of users that exceeds 16,000 using Gold codes. Potentially, the encoder and decoder configuration described above could be fabricated as an integrated waveguide system, making it compact and practical.

Improved Wavelength Division Multiplexing

Wavelength division multiplexing comprises assigning colors to respective users and is used in point-to-point solutions. One problem with this approach is that when multiple frequencies or multiple colors are transmitted down a fiber, the signals are not independent due to nonlinearities in the fiber medium. The signals beat with each other in a nonlinear way and generate new frequencies or new colors in the fiber.

In systems which have channels which are uniformly spaced, the newly generated colors can fall exactly on the existing channels, which is a large source of errors in these systems. This problem is referred to as four wave mixing interference. This problem limits the amount of power that can be transmitted on these channels, because, if too much noise is transmitted, noise will be created in another channel.

The encoding system and method of the present invention substantially eliminates or cancels out this effect. The present invention eliminates this effect for first order terms, while second or third order terms do not cancel out. Cancellation of the first order terms considerably improves performance.

Multi-channel CDMA Model and Analysis

The present invention may be used in the general context of a multi-channel optical CDMA approach. The following discussion assumes the shot noise nature for the photodetection process. The maximum likelihood (ML) detection for the multidimensional waveform signals in the Gaussian channel has been shown to be a straightforward extension of the single waveform case. The present invention uses maximum likelihood (ML) detection in a multi-channel optical CDMA system that distributes the spreading codes over many channels to overcome the restrictions on the signal set. The SNR analysis demonstrates the interference-limited nature of the CDMA protocol.

Figure 9:
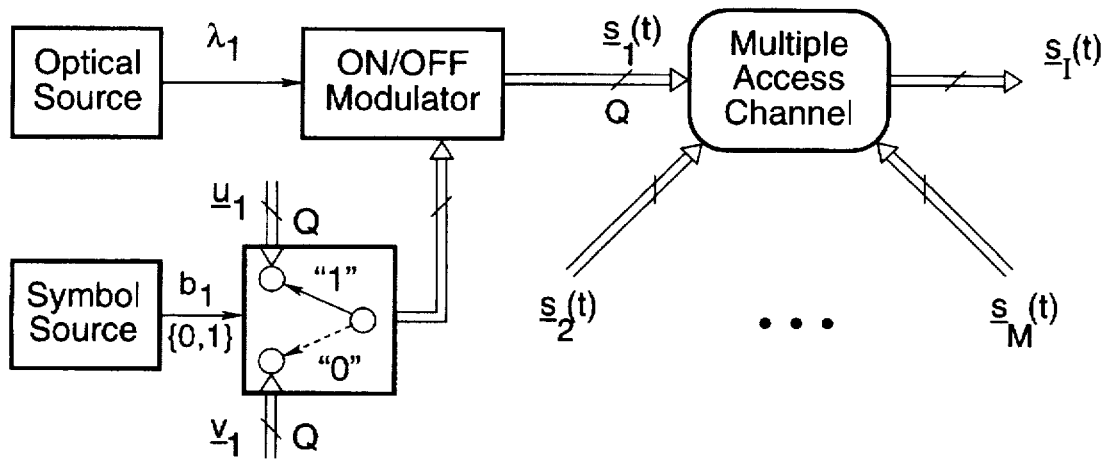
FIG. 9 is a block diagram of an encoder for multi-channel optical CDMA communication according to the present invention.
Figure 10:
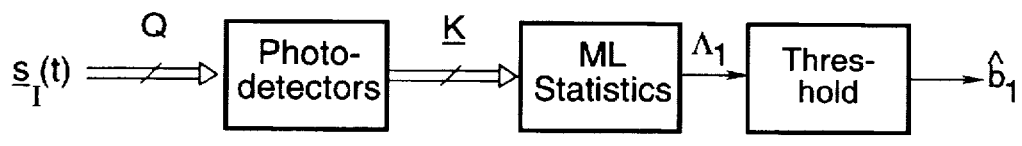
FIG. 10 is a block diagram of a decoder for multi-channel optical CDMA communication according to the present invention.

FIG. 9 illustrates a multi-channel optical channel CDMA system. The intensity of the optical source of user $j$ is modulated by two sets of Q-dimensional, unipolar codes $\underline{u}_j$ and $\underline{v}_j$ of length N according to the transmitted symbol $b_j$, onto Q channels. The Q-dimensional intensity waveforms $\underline{S}_r(t)$ arriving at the detector due to M simultaneously active users are given by:

$$s_j(t) = \sum_{i=1}^{M} s_j(t), \quad (5)$$

where $$s_j(t) = \lambda_j \left\{ \sum_{i=-\infty}^{\infty} \left[ b_{j,i} \sum_{n=0}^{N-1} u_j(n) \Pi_{T_c}(t - nT_c - iT) + \overline{b}_{j,i} \sum_{n=0}^{N-1} \overline{v}_j(n) \Pi_{T_c}(t - nT_c - iT) \right] \right\} \quad (6)$$

The photodetectors, one for each channel, are modeled as Q independent Poisson counting processes whose outputs are i.i.d. Poisson random vectors:

$$\underline{K}^T = [\underline{K}^T_1 \cdots \underline{K}^T_Q]. \quad (7)$$

where $\underline{K}^T_q$ is a length-N vector whose elements are the counts measured by the qth detector during each chip interval $T_c$ in a symbol period $NT_c$. These elements are thus i.i.d. Poisson random variables. Without loss of generality, let user 1 be the desired user. Here it is assumed that the dark current intensities of the photodetectors are identical. Then if the users transmit their symbols synchronously, the ML statistics for user 1 can be shown to be $$\Lambda_1 = \underline{K}^T (\underline{u}_1 - \underline{v}_1), \quad (8)$$

if and only if the Q-dimensional unipolar codes are orthogonal, i.e.:

$$\underline{u}^T_j (\underline{u}_1 - \underline{v}_1) = \underline{v}^T_j (\underline{u}_1 - \underline{v}_1) = 0, \ j \neq 1 \quad (9)$$

For equal a priori symbol probabilities, the corresponding ML threshold is zero. Thus among the unipolar codes $\underline{u}_1$ and $\underline{v}_1$, the probability of error is minimized if and only if $\underline{v}_1 = \overline{\underline{u}}_1$. This also maximizes the signal distance $E[\Lambda_1 | b_1 = 1] - E[\Lambda_1 | b_1 = 0]$.

The above results can be specialized for the 2-channel case. If Q=2, we obtain from equation 9 above that:

$$\underline{u}^T_j = [\underline{U}_j, \overline{\underline{U}}_j], \quad (10)$$

where $\underline{U}_j$ is the unipolar code obtained from an orthogonal bipolar sequence in the manner previously discussed. The ML statistics can then be expressed as $$\Lambda_1 = (\underline{K}^T_1 \underline{U}_j + \underline{K}^T_2 \overline{\underline{U}}_j) - (\underline{K}^T_1 \overline{\underline{U}}_j + \underline{K}^T_2 \underline{U}_j). \quad (11)$$

This is identical to the formula given by (1) and (2) above. The infinitely divisible property of the Poisson random variables can then be invoked, allowing the correlations in equation (11) to be performed optically prior to photodetections.

The above formulation thus generalizes the notion of orthogonality of the spreading codes, allowing their design to be tailored to the physical communication channel. A similar multi-channel CDMA approach in the RF, or Gaussian, channel would also allow greater flexibility in the code design there. For example, there it could provide a means to implement direct-sequence spread spectrum modulation across channels that have non-contiguous transmission bandwidths, without resorting to the hybrid frequency hopping methods. Thus, combining channel attributes into the code designs can be advantageous in both optical and radio domains.

Spectral Encoding System Analysis

In one embodiment, the spectral encoding systems discussed above use length N bipolar Walsh codes to support up to N orthogonal users. The following section analyzes the above spectral encoding system 200 using length N bipolar Walsh codes in terms of the signal-to-noise ratio of the decision statistics K at the input to the threshold comparator. K can be modeled as the difference of two independent random variables $K_A$ and $K_B$, that represent the photoelectron counts, or energies at the decoder's outputs, measured by the two photodetectors during the symbol interval T. Without loss of generality, let user 1 be the desired transmitter among the M simultaneously active users. For shot-noise limited operations, the distributions of $K_A$ and $K_B$, conditioned on the transmitted symbol of user 1, obey the Poisson probability mass function. Their conditional means are given by:

$$E[K_A | b = 1] = E[K_B | b = 0] = N\lambda_1 T + \frac{N}{2} \sum_{j=2}^{N} \lambda_j T + \lambda_d T \quad (12)$$

$$E[K_A | b = 0] = E[K_B | b = 1] = \frac{N}{2} \sum_{j=2}^{M} \lambda_j T + \lambda_d T \quad (13)$$

where $\lambda_j$ is the spectral chip intensity of user j (assumed constant for each user), and $\lambda_d$ is the intensity of the photodetectors' dark currents (assumed equal). The signal-to-noise ratio of user 1 is:

$$SNR = \frac{E^2[K]}{\sigma^2_K} = \frac{N\lambda_1 T}{1 + 2\frac{\lambda_d}{\lambda_1} + \sum_{j=2}^{M} \frac{\lambda_j}{\lambda_1}} \quad (14)$$

For equal chip intensities that are much larger than the dark currents, SNR≈$N\lambda_1 T/M$. It is noted that the dependence of the SNR on M is different from an additive Gaussian noise channel, in which the presence of other users, under synchronous transmissions and orthogonal codes, does not affect the desired user's SNR. This is a consequence of the Poisson detection. Also, in comparison, a spectrum-sliced WDMA system that supports N users, each using two spectral chips for binary FSK, would require the same source bandwidth with SNR≈$\lambda_1 T$, which is N/A times worse. For example, if only half of the N orthogonal users are active at any one time, the SNR is improved by 3 dB. The larger SNR is due to the efficient use of the source spectral power relative to spectrum-sliced WDMA.

Experimental Investigation of the Statistical Model for the SFS

Since the SFS is used as the transmitting light source, a proper analysis of the system performance requires an accurate statistical model for the detector current due to the SFS. Experimentation has been performed to measure the distribution of the photoelectric current from a photodiode under illumination from a spectrum-sliced, erbium-doped SFS. The results show that the statistical distribution of the current fluctuation is non-Gaussian, but rather follows a negative binomial (NB) distribution that describes the photoelectron counting statistics of thermal light. This is consistent with the statistical model of the SFS as a thermal light source.

Bit-error rate (BER) Performance Analysis of WDMA System Using the SFS

The limiting SNR characteristics associated with the SFS result in a BER floor prediction by the Gaussian assumption. The analysis based on the true NB noise statistics shows that the system performance improves as the received power increases, despite the limiting SNR that is proportional to the ratio of the spectral bandwidth and the symbol rate. This has significant implication for practical spectral amplitude encoding systems, since trade-offs between the code length and received power to achieve the desired performance are possible.

Free Space Embodiment

As noted above, the present invention is preferably used in a fiber optic network comprising fiber optic cable. In an alternate embodiment, the present invention is used in a free space optical communication system, i.e., a system which does not use fiber optic cable. In this embodiment, light waves are bounced or reflected off of walls or ceilings, optionally from mirrors positioned in the space, to provide communication. This system is preferably used in areas such as conference rooms, bullpen offices, exhibit halls, and factory work floors, and may be used in areas that have some amount of electrical interference as an alternative to wireless RF communication. A free space optical communication system is not subject to electrical interference, and thus is more practical in some situations than wireless RF communication. In a free space optical communication system, time domain encoding used in conjunction with CDMA may be useful in certain applications, including applications where slower data rates are involved.

Fiber Network

The present invention may be used in various types of broadcast, point to point, and point to multipoint applications, among others, as well as other local area network (LAN) and wide area network (WAN) applications. For example, the present invention may be used in fiber to the node (FTTN), fiber to the curb (FTTC) and fiber to the home (FTTH) broadcast systems or networks, as well as HFC (hybrid fiber coax) systems.

Example applications include broadcast television, including interactive television, Internet access, video on demand, telephone company (telco) service, videoconferencing, and video mail. The present invention may also be used in a fiber optic network existing in a home, wherein the fiber optic network interfaces to coaxial cable or telco lines. For example, a fiber optic network in a home may link the telephone, the television, video recorder, the computer, etc. The fiber network preferably carries a plurality of different data streams, all encoded properly so that each device only sees the relevant data. Fiber optic systems also have the advantage of no EM radiation, making fiber a more suitable data conduit than other cable or wiring solutions.

Conclusion

Therefore, the present invention comprises a general modulation and detection method for bipolar codes in a unipolar system that is suitable for non-coherent CDMA applications. An all-optical spectral encoding design is described that utilizes the spectrum of a broadband optical source, and can accommodate a large pool of subscribers. The present invention using Walsh codes has a SNR that exceeds that of a spectrum-sliced WDMA system with binary FSK due to efficient utilization of the source spectral power.

The present invention includes new modulation and detection principles that permit all-optical implementation of the bipolar, +1/−1, code and correlation detection that have been developed for radio frequency (RF) systems. This is possible in spite of the non-negative, or unipolar, +1/0, nature of the incoherent optical system that only detects and processes the signal intensity. The unipolar optical system designed with these principles is equivalent to the bipolar RF system in that the correlation properties of the bipolar codes is completely preserved. The proposed principles can be interpreted as the generalization of the binary PPM (pulse-position modulation) or FSK (frequency-shifted keying) modulation system. An optical CDMA system is realized by encoding the spectral amplitude of a broadband SFS based on the proposed principles. This spectral encoding approach directly manipulates the amplitude spectrum of the light source according to the binary symbol value in a manner that is decoupled from the symbol rate.

The present invention comprises an improved system and method for using bipolar codes and bipolar correlation techniques in a fiber optic network. The present invention thus provides high autocorrelations and low cross-correlations, while being implemented in a unipolar system. The present invention thus provides the functional output of a bipolar system in a unipolar communication environment. The bipolar codes have already been developed for the RF domain. However, prior to the present invention, these bipolar codes could not be used or implemented in the unipolar optical domain. The present invention provides the same effect as if the optical detector could determine the phase of the optical signal.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A system for performing optical code division multiple access communication on a network using unipolar codes which have bipolar code properties, comprising:

an encoder which receives a light beam and which receives data intended for transmission, wherein said encoder generates one or more optical signals, wherein said one or more optical signals include a unipolar code which has bipolar code properties, wherein said unipolar code represents said data intended for transmission, wherein said unipolar code indicates a first user, wherein said encoder generates said one or more optical signals on one or more optical channels;

a decoder coupled to said one or more optical channels which receives one or more optical signals including a unipolar code, wherein said unipolar code has bipolar code properties, wherein said decoder processes said received one or more optical signals, wherein said decoder detects said transmitted data included in said received one or more optical signals;

wherein said unipolar code comprises a first unipolar word and a second unipolar word, wherein said second unipolar word is the complement of said first unipolar word.

2. The system of claim 1, further comprising:

a broadband light source which generates said light beam to said encoder.

3. The system of claim 1, wherein said bipolar code comprises a sequence taking either +1/−1 values, wherein said first unipolar word is generated from said bipolar sequence by replacing each −1 with 0, wherein said second unipolar word is the complement of said first unipolar word.

4. The system of claim 1, wherein said encoder generates one or more first optical signals including a first unipolar code corresponding to a first bipolar code, and wherein said encoder generates one or more second optical signals including a second unipolar code corresponding to a second bipolar code, wherein said first unipolar code represents a "1" value, and said second unipolar code represents a "0" value.

5. The system of claim 4, wherein said first unipolar code comprises a first unipolar word U and a second unipolar word U', wherein said first unipolar word U is generated from said first bipolar code, wherein said second unipolar word U' is the complement of said first unipolar word U, wherein said second unipolar code comprises a first unipolar word V and a second unipolar word V', wherein said first unipolar word V is generated from said second bipolar code, wherein said second unipolar word V' is the complement of said first unipolar word V.

6. The system of claim 5, wherein said second bipolar code is the complement of said first bipolar code;

wherein said second unipolar code is the complement of said first unipolar code, wherein U=V'.

7. The system of claim 4, further comprising:
a symbol source coupled to said encoder for generating said data intended for transmission;
wherein said encoder includes:
at least one optical mask which receives said light beam for generating first optical signals including said first unipolar code, and for generating second optical signals including said second unipolar code;
a first modulator coupled to said symbol source and optically coupled to said at least one optical mask receiving said data intended for transmission and said first optical signals including said first unipolar code, wherein said first modulator selects said first optical signals including said first unipolar code if said data intended for transmission is a "1" value; and
a second modulator coupled to said symbol source and optically coupled to said at least one optical mask receiving said data intended for transmission and said second optical signals including said second unipolar code, wherein said second modulator selects said second optical signals including said second unipolar code if said data intended for transmission is a "0" value;
wherein at least one of said first modulator and said second modulator generate said one or more optical signals.

8. The system of claim 7, wherein said encoder includes a frequency dispersing element which receives said light beam and generates a dispersed light beam having separated frequency components, wherein said at least one optical mask includes a spatial amplitude mask which receives said dispersed light beam and produces said first optical signals and said second optical signals, wherein said spatial amplitude mask comprises a reflective material and includes a plurality of holes, wherein a transmitted portion of said dispersed light beam passes through said a spatial amplitude mask and a reflected portion of said dispersed light beam is reflected from said spatial amplitude mask, wherein said plurality of holes operate to encode said first unipolar code on said transmitted portion of said dispersed light beam to produce said first optical signals, wherein said reflected portion of said dispersed light beam comprises said second optical signals including said second unipolar code, wherein said second unipolar code comprises a unipolar complement of said first unipolar code.

9. The system of claim 7, wherein said encoder further comprises:

a frequency dispersing element which receives said light beam and generates a dispersed light beam having separated frequency components;

a first mirror which receives said dispersed light beam and directs said dispersed light beam to said at least one optical mask, wherein a transmitted portion of said dispersed light beam passes through said at least one optical mask and a reflected portion of said dispersed light beam is reflected from said at least one optical mask;

a second mirror which receives said transmitted portion of said dispersed light beam which passes through said at least one optical mask, wherein said second mirror directs said transmitted portion of said dispersed light beam to said frequency dispersing element, wherein said frequency dispersing element transmits said transmitted portion of said dispersed light beam to said first modulator wherein said first mirror receives said reflected portion of said dispersed light beam which is reflected from said at least one optical mask, wherein said first mirror directs said reflected portion of said dispersed light beam to said frequency dispersing element, wherein said frequency dispersing element transmits said reflected portion of said dispersed light beam to said second modulator.

10. The system of claim 7, wherein said at least one optical mask includes:

a first spatial amplitude mask which receives said light beam and produces said first optical signals including said first unipolar code, wherein said first spatial amplitude mask includes a first plurality of holes, and wherein said first plurality of holes operate to encode said first unipolar code on said light source to produce said first optical signals; and a second spatial amplitude mask which receives said light beam and produces said second optical signals including said second unipolar code, wherein said second spatial amplitude mask includes a second plurality of holes, wherein said second plurality of holes in said second spatial amplitude mask are a complement of said first plurality of holes in said first spatial amplitude mask, and wherein said second plurality of holes in said second spatial amplitude mask operate to encode said second unipolar code on said light beam to produce said second optical signals.

11. The system of claim 1, wherein said encoder comprises:

a frequency dispersing element which receives said light beam and generates a dispersed light beam having separated frequency components;

a first mirror which receives and redirects said dispersed light beam;

at least one optical mask which receives said dispersed light beam from said first mirror for generating first and second optical signals, wherein said first optical signals comprise a first unipolar code and said second optical signals comprise a second unipolar code, wherein said at least one optical mask comprises a reflective material and includes a plurality of holes, wherein a transmitted portion of said dispersed light beam passes through said at least one optical mask and a reflected portion of said dispersed light beam is reflected from said at least one optical mask, wherein said plurality of holes operate to encode said first unipolar code on said transmitted portion of said dispersed light beam to produce said first optical signals, wherein said at least one optical mask operates to reflect said reflected portion of said dispersed light beam to produce said second optical signals including said second unipolar code, wherein said second unipolar code comprises a unipolar complement of said first unipolar code;

a second mirror which receives said first optical signals comprising said transmitted portion of said dispersed light beam which passes through said at least one optical mask, wherein said second mirror directs said first optical signals to said frequency dispersing element, wherein said frequency dispersing element retransmits said first optical signals;

wherein said first mirror receives said second optical signals comprising said reflected portion of said dispersed light beam which is reflected from said at least one optical mask, wherein said first mirror directs said second optical signals to said frequency dispersing element, wherein said frequency dispersing element retransmits said second optical signals;

a first modulator coupled to said symbol source receiving said data intended for transmission and which receives said first optical signals comprising said first unipolar code, wherein said first modulator selects said first optical signals including said first unipolar code if said data intended for transmission is a "1" value;

a second modulator coupled to said symbol source receiving said data intended for transmission and which receives said second optical signals comprising said second unipolar code, wherein said second modulator selects said second optical signals including said second unipolar code if said data intended for transmission is a "0" value;

wherein at least one of said first modulator and said second modulator generate said one or more optical signals.

12. The system of claim 1, wherein said encoder generates said first unipolar word and said second unipolar word on one or more optical channels using frequency division multiple access techniques.

13. The system of claim 1, wherein said encoder generates said first unipolar word and said second unipolar word on one or more optical channels using time division multiple access techniques.

14. The system of claim 1, wherein said decoder correlates said received one or more opt ical signals;

wherein s aid decoder detects said transmitted data included in said received one or more optical signals if said correlation indicates that said received one or more optical signals include a predetermined unipolar code.

15. The syste m of claim 1 wherein said decoder includes:

at least one optical mask receiving said received one or more optical signals for correlating said received one or more optical signals, wherein said at least one optical mask generates a first optical signal and a second optical signal, a first photodetector optically coupled to said at least one optical mask receiving said first optical signal, wherein said first photodetector converts said first optical signal into a corresponding first electrical signal, a second photodetector optically coupled to said at least one optical mask receiving said second optical signal, wherein said second photodetector converts said second optical signal into a corresponding second electrical signal;

wherein said second electrical signal is subtracted from said first electrical signal to produce an output electrical signals and a detector receiving said output electrical signal for detecting said transmitted data comprised in said output electrical signal.

16. The system of claim 15, wherein said at least one optical mask includes a spatial amplitude mask which receives said received one or more optical signals and produces said first optical signal and said second optical signal, wherein said spatial amplitude mask comprises a reflective material and includes a plurality of holes, wherein said plurality of holes operate to correlate a first unipolar code on said received one or more optical signals to produce said first optical signal, wherein said spatial amplitude mask operates to reflect a portion of said received one or more unipolar optical signals to produce said second optical signal, wherein said second optical signal comprises a unipolar complement of said first optical signal.

17. The system of claim 15, wherein said decoder further comprises:

a frequency dispersing element which receives said received one or more optical signals and generates a dispersed light beam having separated frequency components;

a first mirror which receives said dispersed light beam and directs said dispersed light beam to said at least one optical mask, wherein a transmitted portion of said dispersed light beam passes through said at least one optical mask and a reflected portion of said dispersed light beam is reflected from said at least one optical mask; and a second mirror which receives said transmitted portion of said dispersed light beam which passes through said at least one optical mask, wherein said second mirror directs said transmitted portion of said dispersed light beam to said frequency dispersing element, wherein said frequency dispersing element transmits said transmitted portion of said dispersed light beam to said first photodetector;

wherein said first mirror receives said reflected portion of said dispersed light beam which is reflected from said at least one optical mask, wherein said first mirror directs said reflected portion of said dispersed light beam to said frequency dispersing element, wherein said frequency dispersing element transmits said reflected portion of said dispersed light beam to said second photodetector.

18. The system of claim 15, wherein said decoder further includes:

a lowpass filter coupled to said at least one photodetector for low pass filtering said output electrical signal.

19. The system of claim 15, wherein said decoder further includes:

a time sampling element coupled to said first and second photodetectors receiving said output electrical signal for sampling said output electrical signal; wherein said time sampling element samples said output electrical signal at a substantially maximum energy of said output electrical signal.

20. The system of claim 15, wherein said detector determines if said output electrical signal comprises a logic 1 or 0 value.

21. The system of claim 15, wherein said at least one optical mask includes:

a first spatial amplitude mask which receives said received one or more optical signals and produces said first optical signal, wherein said first spatial amplitude mask includes a first plurality of holes, and wherein said first plurality of holes operate to correlate a first unipolar code on said received one or more optical signals to produce said first optical signal; and a second spatial amplitude mask which receives said received one or more optical signals and produces said second optical signal, wherein said second spatial amplitude mask includes a second plurality of holes, and wherein said second plurality of holes in said second spatial amplitude mask operate to correlate a second unipolar code on said received one or more optical signals to produce said second optical signal.

22. The system of claim 1, wherein said decoder comprises:

a frequency dispersing element which receives said received one or more optical signals and generates a dispersed light beam having separated frequency components;

a first mirror which receives and redirects said dispersed light beam;

at least one optical mask which receives said dispersed light beam from said first mirror for generating first and second optical signals, wherein said at least one optical mask comprises a reflective material and includes a plurality of holes, wherein a transmitted portion of said dispersed light beam passes through said at least one optical mask and a reflected portion of said dispersed light beam is reflected from said at least one optical mask, wherein said plurality of holes operate to correlate a first unipolar code on said received one or more optical signals to produce said first optical signal, wherein said at least one optical mask operates to reflect said reflected portion of said dispersed light beam to produce said second optical signal, wherein said second optical signal comprises a unipolar complement of said first optical signal;

a second mirror which receives said first optical signals comprising said transmitted a portion of said dispersed light beam which passes through said at least one optical mask, wherein said second mirror directs said first optical signals to said frequency dispersing element, wherein said frequency dispersing element retransmits said first optical signals;

wherein said first mirror receives said second optical signals comprising said reflected portion of said dispersed light beam which is reflected from said at least one optical mask, wherein said first mirror directs said second optical signals to said frequency dispersing element, wherein said frequency dispersing element retransmits said second optical signals;

a first photodetector which receives said first optical signals beam from said frequency dispersing element, wherein said first photodetector converts said first optical signal into a corresponding first electrical signal;

a second photodetector which receives said second optical signals from said frequency dispersing element, wherein said second photodetector converts said second optical signal into a corresponding second electrical signal;

wherein said second electrical signal is subtracted from said first electrical signal to produce an output electrical signal; and a detector receiving said output electrical signal for detecting said transmitted data comprised in said output electrical signal.

23. The system of claim 1, wherein said decoder includes:

a first matched filter which receives said received one or more optical signals and generates a first correlation output;

a second matched filter which receives said received one or more optical signals and generates a second correlation output;

a first optical summation unit which sums said correlation outputs produced by said first and second unipolar matched filters and generates a summed optical signal;

at least one photodetector coupled to said first optical summation unit which receives said summed optical signal and generates corresponding electrical signals; and a detector which receives said corresponding electrical signals and detects said data intended for transmission.

24. The system of claim 23, wherein said decoder further includes:

a lowpass filter coupled to said at least one photodetector for low pass filtering said electrical signals, and a time sampling element coupled to said at least one photodetector for sampling said electrical signals.

25. The system of claim 23, wherein said unipolar code comprises a first unipolar word and a second unipolar word;

wherein said encoder generates first optical signals comprising said first unipolar word and said encoder generates second optical signals comprising said second unipolar word, wherein said encoder is configured to generate said first and second optical signals on first and second optical channels, respectively, and to subsequently generate said first and second optical signals on said second and first optical channels, respectively;

wherein said first and second matched filters are configured to receive said first and second optical signals on said first and second optical channels and generate first correlation outputs, and are configured to subsequently receive said second and first optical signals on said first and second optical channels and generate second correlation outputs, wherein said first optical summation unit receives and sums said first correlation outputs and produces a first summation value, and wherein said first optical summation unit subsequently receives and sums said second correlation outputs and produces a second summation value;

wherein said at least one photodetector receives said first summation value and produces first electrical signals, and wherein said at least one photodetector receives said second summation value and produces second electrical signals wherein said decoder includes a time delay element coupled between said photodiode and said threshold detector, wherein said photodiode is coupled to provide said first electrical signals to said detector, and wherein said photodiode is coupled to provide said second electrical signals through said time delay element to said detector.

26. The system of claim 1, further comprising:

an optical communication media coupled between said encoder and said decoder, wherein said optical communication media includes a plurality of optical channels, wherein said optical communication media is adapted for transmitting said unipolar optical signals on said optical channels.

27. An optical decoder for detecting optical code division multiple access communications on a network, wherein said optical code division multiple access communications comprise optical signals including a unipolar code, wherein said unipolar code has bipolar code properties, comprising:

a first spatial amplitude mask which receives one or more optical signals and produces a first optical signal, wherein said first spatial amplitude mask includes a first plurality of holes, and wherein said first plurality of holes operate to correlate a first unipolar code on said received one or more optical signals to produce said first optical signal;

a second spatial amplitude mask which receives said received one or more optical signals and produces a second optical signal, wherein said second spatial amplitude mask includes a second plurality of holes, and wherein said second plurality of holes in said second spatial amplitude mask operate to correlate a second unipolar code on said received one or more optical signals to produce said second optical signal wherein said second unipolar code comprises a complement of said first unipolar code;

a first photodetector optically coupled to said first spatial amplitude mask receiving said first optical signal, wherein said first photodetector converts said first optical signal into a corresponding first electrical signal;

a second photodetector optically coupled to said second spatial amplitude mask receiving said second optical signal, wherein said second photodetector converts said second optical signal into a corresponding second electrical signal;

wherein said second electrical signal is subtracted from said first electrical signal to produce an output electrical signal; and a detector receiving said output electrical signal for detecting said transmitted data comprised in said output electrical signal.

28. A system for performing optical code division multiple access communication on a network using unipolar codes which have bipolar code properties, comprising:

an optical signal generator which receives a light beam and which receives data intended for transmission, wherein said encoder generates one or more optical signals, wherein said one or more optical signals include a unipolar code which has bipolar code properties, wherein said unipolar code represents said data intended for transmission, wherein said unipolar code indicates a first user, wherein said optical signal generator generates said one or more optical signals on one or more optical channels;

an optical signal detector coupled to said one or more optical channels which receives one or more optical signals including a unipolar code, wherein said unipolar code has bipolar code properties, wherein said optical signal detector processes said received one or more optical signals, wherein said optical signal detector detects said transmitted data included in said received one or more optical signals;

wherein said unipolar code comprises a first unipolar word and a second unipolar word, wherein said second unipolar word is the complement of said first unipolar word.

29. The system of claim 28, further comprising:

a broadband light source which generates said light beam to said optical signal generator; and a symbol source coupled to said optical signal generator for generating said data intended for transmission.

30. The system of claim 28, wherein said bipolar code comprises a sequence taking either +1/−1 values, wherein said first unipolar word is generated from said bipolar sequence by replacing each −1 with 0, wherein said second unipolar word is the complement of said first unipolar word.

31. The system of claim 28, wherein said optical signal generator generates one or more first optical signals including a first unipolar code corresponding to a first bipolar code, and wherein said optical signal generator generates one or more second optical signals including a second unipolar code corresponding to a second bipolar code, wherein said first unipolar code represents a "1" value, and said second unipolar code represents a "0" value.

32. The system of claim 31, wherein said first unipolar code comprises a first unipolar word U and a second unipolar word U', wherein said first unipolar word U is generated from said first bipolar code, wherein said second unipolar word U' is the complement of said first unipolar word U, wherein said second unipolar code comprises a first unipolar word V and a second unipolar word V', wherein said first unipolar word V is generated from said second bipolar code, wherein said second unipolar word V' is the complement of said first unipolar word V.

33. The system of claim 28, wherein said optical signal detector is adapted to detect data in one or more first optical signals including a first unipolar code corresponding to a first bipolar code, and wherein said optical signal detector is adapted to detect data in one or more second optical signals including a second unipolar code corresponding to a second bipolar code, wherein said first unipolar code represents a "1" value, and said second unipolar code represents a "0" value.

34. The system of claim 28, further comprising:

an optical communication media coupled to said optical signal generator and said optical signal detector, wherein said optical communication media includes a plurality of optical channels, wherein said optical communication media is adapted for transmitting said optical signals on said optical channels.

35. An optical communication network which performs optical code division multiple access communication using unipolar codes which have bipolar code properties, comprising:

a plurality of encoders which each receive a light beam and which each receive data intended for transmission, wherein each of said encoders generates one or more optical signals, wherein said one or more optical signals include a unipolar code which has bipolar code properties, wherein said unipolar code represents said data intended for transmission, wherein said unipolar code indicates a respective user;

an optical communication media coupled to said plurality of encoders, wherein said optical communication media includes a plurality of optical channels, wherein said optical communication media is adapted for transmitting said optical signals on said optical channels;

a plurality of decoders coupled to said optical communication media which each receive one or more optical signals including a unipolar code, wherein said unipolar code has bipolar code properties, wherein said plurality of decoders each process said received one or more optical signals, wherein said plurality of decoders each detect said transmitted data included in said received one or more optical signals;

wherein said unipolar code comprises a first unipolar word and a second unipolar word, wherein said second unipolar word is the complement of said first unipolar word.

36. The system of claim 35, wherein said bipolar code comprises a sequence taking either +1/−1 values, where in said first unipolar word is generated from said bipolar sequence by replacing each −1 with 0, wherein said second unipolar word is the complement of said first unipolar word.

37. The system of claim 35, wherein each of said plurality of encoders generates one or more first optical signals including a first unipolar code corresponding to a first bipolar code, and wherein each of said plurality of encoders generates one or more second optical signals including a second unipolar code corresponding to a second bipolar code, wherein said first unipolar code represents a "1" value, and said second unipolar code represents a "0" value.

38. The system of claim 37, wherein said first unipolar code comprises a first unipolar word U and a second unipolar word U', wherein said first unipolar word U is generated from said first bipolar code, wherein said second unipolar word U' is the complement of said first unipolar word U, wherein said second unipolar code comprises a first unipolar word V and a second unipolar word V', wherein said first unipolar word V is generated from said second bipolar code, wherein said second unipolar word V' is the complement of said first unipolar word V.

39. The system of claim 35, wherein said optical signal detector is adapted to detect data in one or more first optical signals including a first unipolar code corresponding to a first bipolar code, and wherein said optical signal detector is adapted to detect data in one or more second optical signals including a second unipolar code corresponding to a second bipolar code, wherein said first unipolar code represents a "1" value, and said second unipolar code represents a "0" value.

40. A system for generating optical code division multiple access communications on a network using unipolar codes which have bipolar code properties, comprising:

a broadband light source which generates a light beam;

an encoder which receives the light beam and which receives data intended for transmission, wherein said encoder generates one or more optical signals, wherein said one or more optical signals include a unipolar code which has bipolar code properties, wherein said unipolar code represents said data intended for transmission, wherein said unipolar code indicates a first user, wherein said encoder generates said one or more optical signals on one or more optical channels;

wherein said unipolar code comprises a first unipolar word and a second unipolar word, wherein said second unipolar word is the complement of said first unipolar word.

41. The system of claim 40, wherein said encoder comprises:

a frequency dispersing element which receives said light beam and generates a dispersed light beam having separated frequency components;

a first mirror which receives and redirects said dispersed light beam;

at least one optical mask which receives said dispersed light beam from said first mirror for generating first and second optical signals, wherein said first optical signals comprise a first unipolar code and said second optical signals comprise a second unipolar code, wherein said at least one optical mask comprises a reflective material and includes a plurality of holes, wherein a transmitted portion of said dispersed light beam passes through said at least one optical mask and a reflected portion of said dispersed light beam is reflected from said at least one optical mask, wherein said plurality of holes operate to encode said first unipolar code on said transmitted portion of said dispersed light beam to produce said first optical signals, wherein said at least one optical mask operates to reflect said reflected portion of said dispersed light beam to produce said second optical signals including said second unipolar code, wherein said second unipolar code comprises a unipolar complement of said first unipolar code;

a second mirror which receives said first optical signals comprising said transmitted portion of said dispersed light beam which passes through said at least one optical mask, wherein said second mirror directs said first optical signals to said frequency dispersing element, wherein said frequency dispersing element retransmits said first optical signals;

wherein said first mirror receives said second optical signals comprising said reflected portion of said dispersed light beam which is reflected from said at least one optical mask, wherein said first mirror directs said second optical signals to said frequency dispersing element, wherein said frequency dispersing element retransmits said second optical signals;

a first modulator coupled to said symbol source receiving said data intended for transmission and which receives said first optical signals comprising said first unipolar code, wherein said first modulator selects said first optical signals including said first unipolar code if said data intended for transmission is a "1" value, a second modulator coupled to said symbol source receiving said data intended for transmission and which receives said second optical signals comprising said second unipolar code, wherein said second modulator selects said second optical signals including said second unipolar code if said data intended for transmission is a "0" value;

wherein at least one of said first modulator and said second modulator generate said one or more optical signals.

42. The system of claim 40, wherein said unipolar code comprises a first unipolar word and a second unipolar word; wherein said encoder generates said first unipolar word and said second unipolar word on one or more optical channels using frequency division multiple access techniques.

43. The system of claim 40, wherein said unipolar code comprises a first unipolar word and a second unipolar word; wherein said encoder generates said first unipolar word and said second unipolar word on one or more optical channels using time division multiple access techniques.

44. The system of claim 40, wherein said bipolar code comprises a sequence taking either +1/−1 values, wherein said first unipolar word is generated from said bipolar sequence by replacing each −1 with 0, wherein said second unipolar word is the complement of said first unipolar word.

45. The system of claim 40, wherein said encoder generates one or more first optical signals including a first unipolar code corresponding to a first bipolar code, and wherein said encoder generates one or more second optical signals including a second unipolar code corresponding to a second bipolar code, wherein said first unipolar code represents a "1" value, and said second unipolar code represents a "0" value.

46. The system of claim 45, wherein said first unipolar code comprises a first unipolar word U and a second unipolar word U', wherein said first unipolar word U is generated from said first bipolar code, wherein said second unipolar word U' is the complement of said first unipolar word U, wherein said second unipolar code comprises a first unipolar word V and a second unipolar word V', wherein said first unipolar word V is generated from said second bipolar code, wherein said second unipolar word V' is the complement of said first unipolar word V.

47. The system of claim 46, wherein said second bipolar code is the complement of said first bipolar code;
wherein said second unipolar code is the complement of said first unipolar code, wherein U = V'.

48. The system of claim 42, further comprising:
an optical communication media coupled to said encoder, wherein said optical communication media includes a plurality of optical channels, wherein said optical communication media is adapted for transmitting said optical signals on said optical channels.

49. The system of claim 42, wherein said broadband light source which generates said light beam to said encoder comprises a superfluorescent fiber source.

50. The system of claim 42, further comprising:
a symbol source coupled to said encoder for generating said data intended for transmission.

51. The system of claim 42, wherein said unipolar code comprises a first unipolar word and a second unipolar word; wherein said system includes a symbol source coupled to said encoder for generating said data intended for transmission;
wherein said encoder includes:
at least one optical mask which receives said light beam for generating first optical signals including said first unipolar code, and for generating second optical signals including said second unipolar code;
a first modulator coupled to said symbol source and optically coupled to said at least one optical mask receiving said data intended for transmission and said first optical signals including said first unipolar code, wherein said first modulator selects said first optical signals including said first unipolar code if said data intended for transmission is a "1" value; and
a second modulator coupled to said symbol source and optically coupled to said at least one optical mask receiving said data intended for transmission and said second optical signals including said second unipolar code, wherein said second modulator selects said second optical signals including said second unipolar code if said data intended for transmission is a "0" value;
wherein at least one of said first modulator and said second modulator generate said one or more optical signals.

52. The system of claim 51, wherein said at least one optical mask includes a spatial amplitude mask which receives said light beam and produces said first optical signals and said second optical signals, wherein said spatial amplitude mask comprises a reflective material and includes a plurality of holes, wherein a transmitted portion of said dispersed light beam passes through said a spatial amplitude mask and a reflected portion of said dispersed light beam is reflected from said spatial amplitude mask, wherein said plurality of holes operate to encode said first unipolar code on said transmitted portion of said dispersed light beam to produce said first optical signals, wherein said reflected portion of said dispersed light beam comprises said second optical signals including said second unipolar code, wherein said second unipolar code comprises a unipolar complement of said first unipolar code.

53. The system of claim 52, wherein said encoder further comprises:
a frequency dispersing element which receives said light beam and generates a dispersed light beam having separated frequency components;
a first mirror which receives said dispersed light beam and directs said dispersed light beam to said at least one optical mask, wherein a transmitted portion of said dispersed light beam passes through said at least one optical mask and a reflected portion of said dispersed light beam is reflected from said at least one optical mask.
a second mirror which receives said transmitted portion of said dispersed light beam which passes through said at least one optical mask, wherein said second mirror directs said transmitted portion of said dispersed light beam to said frequency dispersing element, wherein said frequency dispersing element transmits said transmitted portion of said dispersed light beam to said first modulator
wherein said first mirror receives said reflected portion of said dispersed light beam which is reflected from said at least one optical mask, wherein said first mirror directs said reflected portion of said dispersed light beam to said frequency dispersing element, wherein said frequency dispersing element transmits said reflected portion of said dispersed light beam to said second modulator.

54. The system of claim 51, wherein said at least one optical mask includes:
a first spatial amplitude mask which receives said light beam and produces said first optical signals including said first unipolar code, wherein said first spatial amplitude mask includes a first plurality of holes, and wherein said first plurality of holes operate to encode said first unipolar code on said light source to produce said first optical signals; and
a second spatial amplitude mask which receives said light beam and produces said second optical signals including said second unipolar code, wherein said second spatial amplitude mask includes a second plurality of holes, wherein said second plurality of holes in said second spatial amplitude mask are a complement of said first plurality of holes in said first spatial amplitude mask, and wherein said second plurality of holes in said second spatial amplitude mask operate to encode said second unipolar code on said light beam to produce said second optical signals.

55. A system for generating optical code division multiple access communications on a network using unipolar codes with bipolar code properties, comprising:
a broadband light source which generates a light beam;
a symbol source which generates data intended for transmission;
a first optical mask which receives said light beam for generating first optical signals including a first unipolar code, wherein said first optical mask generates second optical signals including a second unipolar code, wherein the second unipolar code is the complement of the first unipolar code;

a first modulator coupled to said symbol source and optically coupled to said at least one optical mask receiving said data intended for transmission and said first optical signals including said first unipolar code, wherein said first modulator selects said first optical signals including said first unipolar code if said data intended for transmission is a "1" value; and a second modulator coupled to said symbol source and optically coupled to said at least one optical mask receiving said data intended for transmission and said second optical signals including said second unipolar code, wherein said second modulator selects said second optical signals including said second unipolar code if said data intended for transmission is a "0" value;

wherein at least one of said first modulator and said second modulator generate said one or more optical signals.

56. The system of claim 55, wherein said first unipolar code comprises a first unipolar word and a second unipolar word, wherein said second unipolar word is the complement of said first unipolar word.

57. The system of claim 56, wherein said bipolar code comprises a sequence taking either +1/−1 values, wherein said first unipolar word is generated from said bipolar sequence by replacing each −1 with 0, wherein said second unipolar word is the complement of said first unipolar word.

58. The system of claim 55, wherein said encoder generates one or more first optical signals including a first unipolar code corresponding to a first bipolar code, and wherein said encoder generates one or more second optical signals including a second unipolar code corresponding to a second bipolar code, wherein said first unipolar code represents a "1" value, and said second unipolar code represents a "0" value.

59. An optical decoder for detecting optical code division multiple access communications on a network, wherein said optical code division multiple access communications comprise optical signals including a unipolar code, wherein said unipolar code has bipolar code properties, comprising:

a first optical mask receiving said received one or more optical signals for correlating said received one or more optical signals, wherein said first optical mask generates a first optical signal and a second optical signal, wherein said second optical signal comprises a complement of said first optical signal;

a first photodetector optically coupled to said at least one optical mask receiving said first optical signal, wherein said first photodetector converts said first optical signal into a corresponding first electrical signal;

a second photodetector optically coupled to said at least one optical mask receiving said second optical signal, wherein said second photodetector converts said second optical signal into a corresponding second electrical signal;

wherein said second electrical signal is subtracted from said first electrical signal to produce an output electrical signal; and a detector receiving said output electrical signal for detecting said transmitted data comprised in said output electrical signal.

60. The optical decoder of claim 59, wherein said first optical mask includes a spatial amplitude mask which receives said received one or more optical signals and produces said first optical signal and said second optical signal, wherein said spatial amplitude mask comprises a reflective material and includes a plurality of holes, wherein said plurality of holes operate to correlate a first unipolar code on said received one or more optical signals to produce said first optical signal, wherein said spatial amplitude mask operates to reflect a portion of said received one or more unipolar optical signals to produce said second optical signal, wherein said second optical signal comprises a unipolar complement of said first optical signal.

61. The optical decoder of claim 59, wherein said decoder further comprises:

a frequency dispersing element which receives said received one or more optical signals and generates a dispersed light beam having separated frequency components;

a first mirror which receives said dispersed light beam and directs said dispersed light beam to said first optical mask, wherein a transmitted portion of said dispersed light beam passes through said first optical mask and a reflected portion of said dispersed light beam is reflected from said first optical mask; and a second mirror which receives said transmitted portion of said dispersed light beam which passes through said first optical mask , wherein said second mirror directs said transmitted portion of said dispersed light beam to said frequency dispersing element, wherein said frequency dispersing element transmits said transmitted portion of said dispersed light beam to said first photodetector;

wherein said first mirror receives said reflected portion of said dispersed light beam which is reflected from said first optical mask, wherein said first mirror directs said reflected portion of said dispersed light beam to said frequency dispersing element, wherein said frequency dispersing element transmits said reflected portion of said dispersed light beam to said second photodetector.

62. The optical decoder of claim 59, wherein said decoder further includes:

a lowpass filter coupled to said at least one photodetector for low pass filtering said output electrical signal.

63. The system of claim 59, wherein said decoder further includes:

a time sampling element coupled to said first and second photodetectors receiving said output electrical signal for sampling said output electrical signal; wherein said time sampling element samples said output electrical signal at a substantially maximum energy of said output electrical signal.

64. The system of claim 59, wherein said detector determines if said output electrical signal comprises a logic 1 or 0 value.

65. A method for performing optical code division multiple access communication on a network using unipolar codes having bipolar code properties, comprising:

generating a broadband light beam;

generating data intended for transmission;

encoding a unipolar code onto said light beam to produce one or more optical signals, wherein said one or more optical signals include said unipolar code, wherein said unipolar code has bipolar code properties, wherein said unipolar code represents said data intended for transmission;

generating said one or more optical signals on one or more optical channels;

wherein said unipolar code comprises a first unipolar word and a second unipolar word, wherein said second unipolar word is the complement of said first unipolar word.

66. The method of claim 65, further comprising:

receiving said one or more optical signals including said unipolar code;

correlating said received one or more optical signals with a first unipolar code; and detecting said transmitted data included in said received one or more optical signals.

67. The method of claim 65, wherein said bipolar code comprises a sequence taking either +1/−1 values, wherein said first unipolar word is generated from said bipolar sequence by replacing each −1 with 0, wherein said second unipolar word is the complement of said first unipolar word.

68. The method of claim 67, wherein said encoding generates one or more first optical signals including a first unipolar code corresponding to a first bipolar code, and wherein said encoding generates one or more second optical signals including a second unipolar code corresponding to a second bipolar code, wherein said first unipolar code represents a "1" value, and said second unipolar code represents a "0" value.

69. The method of claim 68, wherein said first unipolar code comprises a first unipolar word U and a second unipolar word U', wherein said first unipolar word U is generated from said first bipolar code, wherein said second unipolar word U' is the complement of said first unipolar word U;

wherein said second unipolar code comprises a first unipolar word V and a second unipolar word V', wherein said first unipolar word V is generated from said second bipolar code, wherein said second unipolar word V' is the complement of said first unipolar word V.

70. The method of claim 69, wherein said second bipolar code is the complement of said first bipolar code;

wherein said second unipolar code is the complement of said first unipolar code, wherein U=V'.

71. The method of claim 65, wherein said encoding said unipolar code onto said light beam to produce one or more optical signals comprises:

dispersing said light beam to generate a dispersed light beam having separated frequency components;

transmitting said dispersed light beam through an optical mask, wherein said optical mask comprises a reflective material and includes a plurality of holes;

a portion of said dispersed light beam passing through said optical mask to produce first optical signals, wherein said plurality of holes operate to encode said first unipolar code on said transmitted portion of said dispersed light beam to produce said first optical signals; and a portion of said dispersed light beam reflecting from said optical mask to produce second optical signals, wherein said reflected portion of said dispersed light beam comprises said second optical signals including said second unipolar code, wherein said second unipolar code comprises a unipolar complement of said first unipolar code.

* * * * *

UNITED STATES PATENT AND TRADEMARK OFFICE
CERTIFICATE OF CORRECTION

PATENT NO. : 5,760,941

DATED : June 2, 1998

INVENTOR(S) : James F. Young, Benhaam Aazhang and Lim Nguyen

It is certified that error appears in the above-identified patent and that said Letters Patent is hereby corrected as shown below:

In the Claims:

Claim 14, col. 33, line 48, please delete "opt ical" and substitute "optical".

Claim 14, col. 33, line 49, please delete "s aid" and substitute "said".

Claim 15, col. 33, line 53, please delete "syste m of claim 1" and substitute "system of claim 1,".

Claim 15, col. 34, line 3, please delete "signals and" and substitute "signal; and".

Claim 22, col. 35, lines 38 and 39 should be joined and the "a" should be deleted. Should read "transmitted portion".

Claim 46, col. 41, line 12, please make a new paragraph after U.

Claim 61, col. 44, line 26, delete "mask ," and substitute "mask,".

Signed and Sealed this

Eighth Day of September, 1998

Attest:

BRUCE LEHMAN

*Attesting Officer*  *Commissioner of Patents and Trademarks*